US012447889B2

(12) United States Patent
Berry et al.

(10) Patent No.: US 12,447,889 B2
(45) Date of Patent: Oct. 21, 2025

(54) FLUID BAFFLE FOR A TANK

(71) Applicant: TRANS TANK INTERNATIONAL PTY LTD, Nathalia (AU)

(72) Inventors: Andrew Mark Berry, Port Melbourne (AU); Andre Stephen Buchner, Nathalia (AU)

(73) Assignee: TRANS TANK INTERNATIONAL PTY LTD, Nathalia (AU)

( * ) Notice: Subject to any disclaimer, the term of this patent is extended or adjusted under 35 U.S.C. 154(b) by 0 days.

(21) Appl. No.: 18/625,911

(22) Filed: Apr. 3, 2024

(65) Prior Publication Data
US 2024/0246473 A1 Jul. 25, 2024

Related U.S. Application Data

(63) Continuation of application No. 17/052,625, filed as application No. PCT/AU2019/050436 on May 10, 2019, now Pat. No. 12,054,087.

(30) Foreign Application Priority Data

May 11, 2018 (AU) ................. 2018901625

(51) Int. Cl.
B60P 3/22 (2006.01)
B60K 15/077 (2006.01)

(52) U.S. Cl.
CPC .......... B60P 3/2235 (2013.01); B60K 15/077 (2013.01)

(58) Field of Classification Search
CPC .......... B60P 3/2235; B60K 2015/0344; B60K 15/077; F17C 2260/016
See application file for complete search history.

(56) References Cited

U.S. PATENT DOCUMENTS

| 3,349,953 | A | 10/1967 | Conway et al. | |
| 6,062,417 | A | 5/2000 | Evans | |
| 2001/0013366 | A1 | 8/2001 | Spickelmire | |
| 2004/0134916 | A1 | 7/2004 | Bambacigno | |
| 2007/0199254 | A1* | 8/2007 | Luburic | ................. E04B 5/328 |
| | | | | 52/80.1 |
| 2012/0311959 | A1 | 12/2012 | Miedzik | |
| 2017/0165512 | A1 | 6/2017 | Liu | |

FOREIGN PATENT DOCUMENTS

WO 2015/127508 9/2015

OTHER PUBLICATIONS

Baffle Ball Assembly [Viewed on internet on Aug. 14, 2018] Viewed on internet.< URL: https://www.youtube.com/watch?v=la31xspXfnM > Published on Sep. 1, 2016.
Search Report & Written Opinion issued in Int'l App. No. PCT/AU2019/050436 (2019).

* cited by examiner

Primary Examiner — Andrew T Kirsch
(74) Attorney, Agent, or Firm — Barnes & Thornburg LLP

(57) ABSTRACT

Embodiments relate to fluid baffles and parts and kits for making such baffles. For example, some embodiments relate to a fluid baffle for use in a tank, where the baffle comprises: a body defining an interior volume and defining a plurality of fluid passage apertures at spaced positions around the body to allow fluid to easily pass into and out of the interior volume; wherein the body comprises a continuous wall that defines a plurality of convex regions spaced from each other around the body and defines concave regions between the convex regions.

19 Claims, 17 Drawing Sheets

FLUID BAFFLE FOR A TANK

CROSS-REFERENCE TO RELATED APPLICATIONS

This application is a continuation of U.S. patent application Ser. No. 17/052,625, filed on Nov. 3, 2020, which is a US National Stage application of PCT/AU2019/050436, filed on May 10, 2019, which claims priority from Australian patent application Ser. No. 20/189,01625, filed May 11, 2018, the entirety of which are each hereby fully incorporated by reference herein.

TECHNICAL FIELD

Embodiments of the present disclosure generally relate to fluid baffles. In particular, embodiments relate to fluid baffles suitable for use in tanks containing liquid in order to impede or interrupt sloshing of the liquid within the tank. Such fluid baffles may be lightweight units that can easily be placed inside a liquid storage tank by hand through a top opening, for example.

BACKGROUND

In some fields of industry, it is necessary to transport liquids within a tank. Such a tank may be positioned on a vehicle, for example. Where a vehicle carrying such a tank of liquid is moving and requires to change direction, the inertia of the liquid inside the tank can tend to result in sloshing of the liquid toward one part of the tank. This sloshing can have an undesirable effect on the manoeuvrability of the vehicle. Additionally, if a vehicle carrying the liquid needs to stop relatively quickly, then a significant forward sloshing of liquid in the tank can have the effect of belatedly pushing the vehicle further forward after it has initially stopped. This can cause the vehicle to inadvertently enter an intersection or even impact a stationary object or vehicle in front of the stopping vehicle.

Rather than forming fixed permanent baffles inside a liquid tank in order to interrupt or impede sloshing, a light baffle in the shape of a ball can be placed inside the tank. Such so called "ball baffles" have apertures that allow liquid to pass into and out of the exterior of the baffle. When many such baffles are placed inside a liquid storage tank, the cumulative effect of the baffles is to impede and/or interrupt sloshing liquid flows.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each of the appended claims.

SUMMARY

Some embodiments relate to a fluid baffle for use in a tank, the baffle comprising:

a body defining an interior volume and defining a plurality of fluid passage apertures at spaced positions around the body to allow fluid to easily pass into and out of the interior volume;

wherein a shape of the body is such that outermost points of the body map onto points on a notional spherical volume and wherein recessed regions of the body between the outermost points are recessed from the outermost points.

In some embodiments, the body comprises a wall that defines the interior volume and the fluid passage apertures. The wall may be continuous or define a continuous outer surface. The outer surface may define the fluid passage apertures, the outermost points and the recessed regions. In embodiments where the baffle comprises two parts coupled together, each part of the body comprises a continuous wall with a continuous outer surface that defines the fluid passage apertures.

In some embodiments, the outermost points are disposed on outermost faces, and the recessed regions are recessed relative to the outermost faces. The recessed regions may define saddle regions in between the outermost faces. At least some of the fluid passage apertures may be defined in the recessed regions and/or the saddle regions. At least some of the fluid passage apertures may be defined in the outermost faces. The outermost faces may comprise convex faces. The recessed regions may comprise concave regions.

Some embodiments relate to a fluid baffle for use in a tank, the baffle comprising:

a body defining an interior volume and defining a plurality of fluid passage apertures at spaced positions around the body to allow fluid to easily pass into and out of the interior volume;

wherein the body defines a plurality of convex regions spaced from each other around the body and defines a plurality of concave regions between the convex regions.

In some embodiments, the body comprises a continuous wall that defines the plurality of convex regions. In some embodiments, the continuous wall defines the plurality of fluid passage apertures.

The baffle body may be formed of a light-weight plastic material. The baffle body may be formed of two pieces coupled together to define the interior volume. The two pieces may be identically formed. The two pieces may be configured to nest with each other for space-efficient transport prior to assembly. The two pieces may be configured to be manually press-fitted together to form the body. The two pieces may not be readily manually separable once coupled together. The two pieces may each comprise multiple coupling portions. Each of the two pieces may have at least one male coupling portion and at least one female coupling portion spaced from the at least one male coupling portion.

A maximum dimension across the body may be between about 100 mm and about 375 mm. The body may be substantially hollow and substantially free of internal baffle structure. The body may define a shell structure. The shape of the body may be configured to promote interference with adjacent ones of the baffles within the tank to reduce relative movement between adjacent baffles when compared to spherical baffles.

Some embodiments relate to a fluid baffle comprising a body defining a hollow interior volume and having multiple fluid passage apertures spaced around the body to allow fluid to freely pass into or out of the interior volume, wherein the body has multiple rounded exterior faces without the body having a spherical shape. Such rounded exterior faces may be defined by a continuous wall of the body, wherein the fluid passage apertures are formed in the wall.

Some embodiments relate to a liquid tank comprising multiple ones of the fluid baffle disposed inside the tank. Some embodiments relate to a motorised road-going vehicle having the liquid tank mounted thereon.

Some embodiments relate to a method of making a fluid baffle kit, comprising:
  forming first and second baffle pieces that are connectable to each other, the first and second baffle pieces defining fluid passage apertures and each defining a non-hemispherical concave interior banded by an outer rim, wherein when the first and second baffle pieces are connected to each other along their outer rims, the first and second baffle pieces define a baffle body having a hollow non-spherical interior volume.

The outer rim of each of the first and second baffle pieces may be formed to be approximately circular. Each of the first and second baffle pieces may be formed to have convex exterior surfaces separated by recessed exterior surfaces. At least one of the convex exterior surfaces may be formed to at least partially define one or more of the fluid passage apertures. The first and second baffle pieces may be formed to define fluid passage apertures in the recessed exterior surfaces. The first and second baffle pieces may be formed to have mating connection portions, which when mated together, retain the first and second baffle pieces in a connected state.

Some embodiments relate to a method of assembly of a fluid baffle, comprising receiving the fluid baffle kit formed by the method described above; and connecting together the first and second baffle pieces so that the first and second baffle pieces are in a connected state.

Some embodiments relate to a fluid baffle kit, comprising:
  first and second baffle pieces that are connectable to each other, the first and second baffle pieces defining fluid passage apertures and each defining a non-hemispherical concave interior banded by an outer rim, wherein when the first and second baffle pieces are connected to each other along their outer rims, the first and second baffle pieces define a baffle body having a hollow non-spherical interior volume.

DETAILED DESCRIPTION

Embodiments of the present disclosure generally relate to fluid baffles. In particular, embodiments relate to fluid baffles suitable for use in tanks containing liquid in order to impede or interrupt sloshing of the liquid within the tank. Such fluid baffles may be lightweight units that can easily be placed inside a liquid storage tank by hand through a top opening, for example.

Embodiments described herein relate to fluid baffles having a non-spherical or less-than-spherical shape, although some outer surfaces of the baffle are rounded and/or have convex projections. Described embodiments generally define a number of apertures defined in walls of the baffle at spaced positions across the baffle body to allow fluid passage between internal and external volumes of the baffle. The shape of the body may be such that outermost points of the body (excluding any projecting circumferential rim or flange) map onto points on a notional spherical volume. Recessed regions of the body between the outermost points are recessed from the outermost points.

Figure 8:
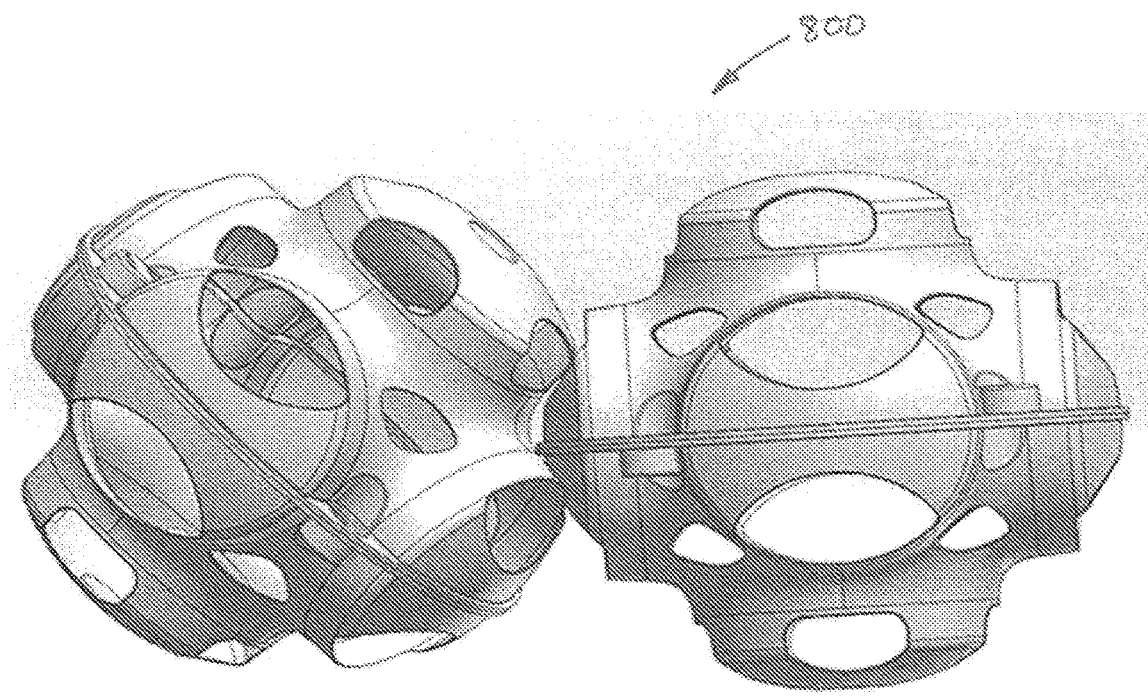
FIG. 8 is an illustration of how multiple fluid baffles may interact when placed together within a liquid tank.
Figure 9:
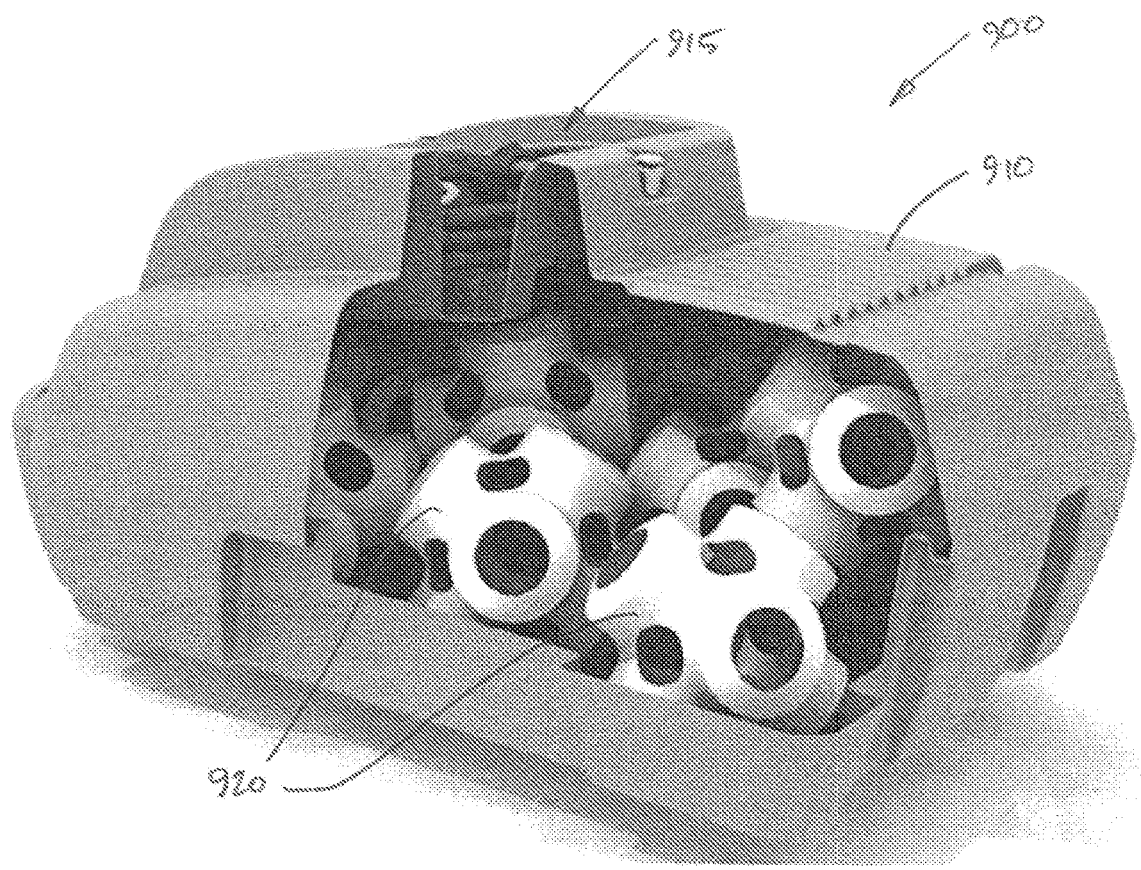
FIG. 9 is a perspective view of a liquid tank in partial cutaway, illustrating placement of multiple fluid baffles within a tank.

The shape of the baffle walls and the configuration and location of the apertures defined therein are such that interference between baffle wall edges or areas of adjacently positioned baffles within a tank is relatively likely to occur. Thus, as adjacent baffles freely move within the tank, they may catch or lock against one another. For a number of such baffles catching or locking against each other, the result may be such that the baffles form something akin to a connected mass of baffle material with a greater potential for interrupting and impeding sloshing liquids than if the separate baffles were more like spherical balls. An example of baffles according to embodiments described herein interfering or catching against each other is illustrated in FIG. 8 as arrangement 800, for example. Further, FIG. 9 illustrates how baffles of such a non-spherical or less-than-spherical shape may interact and interfere with each other within a tank 900.

Referring in particular to FIGS. 1 to 5, 6A, 6B, 7A and 7B, fluid baffles 100 according to some embodiments are described in further detail. As best seen in FIGS. 1 to 4, fluid baffle 100 is formed of two parts, a first part 102 and a second part 104. In some embodiments, first and second parts 102, 104 are identically formed and shaped. However, in other embodiments, the first part 102 may have differing contours, aperture sizes, wall shapes or other configurations, as compared to second part 104, while still permitting the first and second parts 102, 104 to couple together, as will be described further below.

Figure 10:
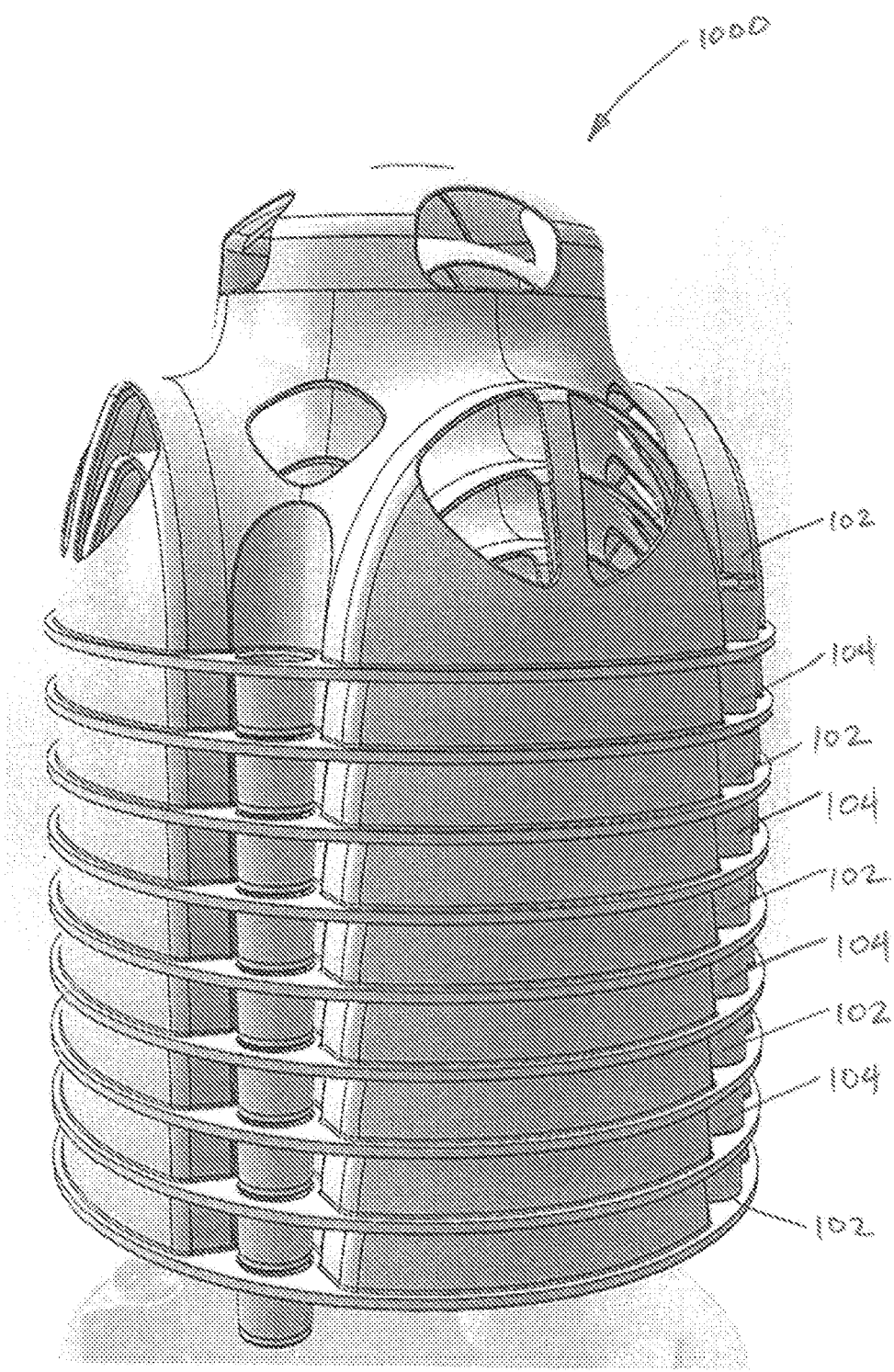
FIG. 10 is a perspective view of a plurality of fluid baffle pieces in a nesting arrangement for space efficient transport prior to assembly.

While first part 102 and second part 104 need not be identical, such identicality allows for the parts to be nested, such as is illustrated in FIG. 10. FIG. 10 shows a stack 1000 of identical halves 102, 104 of a fluid baffle, any two of which can be coupled together to form a baffle 100, as described herein. Stack 1000 is a more space-efficient means of transporting baffles 100 than if the baffles 100 were pre-assembled prior to transport. For this reason, the connection of the two parts of the baffle 100 is designed to be readily performed manually once the baffle pieces 102, 104 are transported to a desired location. For example, the two pieces 102, 104 may be manually pressed together when in the facing orientation shown in FIG. 5. The body of the baffle 100 thus formed is substantially hollow and substantially free of internal baffle structure.

In baffle 100, first piece 102 is the same as second piece 104, except that they are coupled together in a mirror image fashion, with one of the pieces forming a top piece and the other a bottom piece, although such top and bottom orientation is arbitrary and only used here for description purposes. Each baffle part 102, 104 defines a domed portion 110 at a top or bottom and a series of half domes 130 at spaced positions around the sides of the baffle 100 adjacent a coupling rim 151.

The half domes 130 combine across the rims 151 of the connected halves of baffle 100 to form generally convex domed side portions of approximately similar curvature and convexity to the convex domed portions 110. In between the domed portions 110, 130, the body of each baffle half 102, 104 is recessed relative to those domed portions 110, 130. There are concave recessed areas, portions or regions 140 between each of the neighbouring side domed portions 130, as well as between each of those side domed portions and the top and bottom domed portions 110. The walls of the baffle halves 102, 104, are formed to provide a relatively smooth transition between the domed portions 110, 130 and the recessed portions or regions 140 therebetween. The curved faces of the domed portions 110, 130 may be part spherical or arranged so that various points along the wall surfaces of the domes portions 110, 130 map onto a notional spherical or substantially spherical surface In contrast to the domed portions 110, 130, the recessed portions or regions 140 curve and transition into one another across the body of the body half 102 or 104. The domed portions 110, 130 are not continuous with each other and are generally divided from each other by the recessed portions or regions 140.

Because of the curved transition of the recessed portions or regions 140 across the baffle halves 102, 104, saddle regions 142 may be formed in some parts of the recessed areas or regions 140. Such saddle regions 142 may be defined by areas of curvature of one orientation crossing areas of curvature of another orientation. In other words, such saddle regions 142 may resemble the shape of a hyperbolic paraboloid (or a Pringles™ potato chip), for example.

A minimum recess distance (depth) between the surface of the recessed portion or regions 140 and the point where a notional sphere would be (as measured along a radial line extending from a centre of the baffle 100 through the recessed portion or region 140) may be in the range of around 15 to 30 mm, for example. In other words, the surface of the recessed portion or region 140 may be recessed from the notional spherical surface (that domed portions 110, 130 generally map onto) by a recess depth in the range of about 15 to 30 mm. In some embodiments, the recess depth may be in the range of around 18 to 24 mm or in the range of around 20 to 22 mm, for example.

Further, a vertical distance between the top-most point of the domed portion 110 and the most inwardly recessed part of the adjacent recessed areas or regions 140 (i.e. saddle regions 142) may be in the range of around 50 to 75 mm, for example. In some embodiments, the vertical distance may be in the range of around 55 to 70 mm or in the range of around 60 to 65 mm, for example.

A number of fluid passage apertures are formed in and defined by the top and bottom baffle pieces 102, 104. These apertures include, but are not limited to: a top aperture 114 defined toward an outer apex of convex domed portion 110; top side apertures 112 that are radially spaced from the top aperture 114 and interrupt the transition of the domed portion 110 toward the surrounding and adjacent recessed area 140; side apertures 132 defined in the side domed portions 130; and recessed apertures 145 defined in the recessed areas or regions 140. The recessed apertures 145 may be formed in or between saddle regions 142 of the recessed areas or regions 140, for example. The above-described fluid passage apertures are all sized to be large enough to readily permit the flow of liquids therethrough without appreciable restriction, where such liquids have a viscosity approximately similar to (i.e., within about 50%) the viscosity of water, for example. Such fluid passage apertures may have regular or irregular shapes and may have dimensions ranging from 10 mm to 100 mm across, for example.

In some embodiments, aperture 114 may be omitted or replaced with a small recessed area. In such embodiments where aperture 114 is omitted, top side apertures 112 may be enlarged or expanded in size to compensate for the reduced total aperture area that would have otherwise resulted from omission of aperture 114.

For baffle 100, it is desirable to have a balance between the surface area defined by the wall material of the baffle and the apertures defined therebetween, so that there is enough wall material to have a flow interruption effect, but not so much wall material that the liquid in the tank cannot readily flow into and out of the interior volume of the baffle 100 or so that the liquid does not readily drain from the interior volume. A ratio of wall surface area of the baffle to fluid passage aperture area may be about 7.7 to 2.3, for example. In other words, the open area of the baffle may be about 23% and the closed area about 77%. In other examples, the ratio may be in a range between about 6 to 4 and about 9 to 1 (i.e. 60-90% closed area) or a range between about 7 to 3 and 8.5 to 1.5 (i.e. 70-85% closed area) or a range between about 7.5 to 2.5 and about 8 to 2 (i.e. 75-80% closed area).

As shown in FIGS. 1 to 5, for example, the top aperture 114 may be concentric with a vertical axis of the baffle 100, where the vertical axis is defined as perpendicular to a plane generally aligning or parallel with the rim region 152. Top (and bottom) aperture 114 may have a diameter in the range of around 3 to 5 cm or 5 to 10 cm, for example. However, in some embodiments, more than one such top aperture 114 may be provided or a non-circular aperture may be formed in the top surface 105 of the top domed portion 110. Embodiments shown and described in relation to FIGS. 11A, 11B, 12A and 12B give an example of such non-circular apertures in the form of top apertures 1114.

Recessed apertures 145 may be approximately diamond shaped, rounded square shape or generally oval or circular, for example. Recessed apertures 145 may have a diameter or maximum dimension in the range of around 35-70 mm, for example. Side apertures 132 may be defined by each half domed portion 130 such that there are two such side apertures 132 in each half domed portion 130. Such side apertures 132 may be positioned to be separated by a web or strip 131 that partially defines the domed portion 130 and extends from an area adjacent the rim region 152 toward one of the saddle regions 142. Side apertures 132 may be somewhat triangular, wedge or guitar pick-shaped in appearance, for example. The largest dimension across the side apertures 132 may be in the range of around 75 mm and a smallest dimension of about 45 mm, for example. In some examples, the largest dimension across the side apertures 132 may be in the range of around 65 mm and a smallest dimension of about 55 mm.

The form of the web or strip 131 generally follows the contour of the domed portion 130, but because of the presence of the side apertures 132 on each lateral side of the web or strip 131, side edges 131a (FIG. 3) of the strip 131 can play a more prominent catching or interfering role as adjacent baffles 100 move against each other. Similarly, the side edges 112a (FIG. 3) defined by top side apertures 112 are configured to promote catching and interference with walls and edges of adjacent baffles 100. The web or strip may have a lateral width of around 8-15 mm, for example.

Top side apertures 112 may have a maximum diameter or dimension in the range of around 50-90 mm and a minimum dimension of around 30-50 mm, for example. In some examples, the top side aperture may have an approximately elliptical shape with long and short axes of about 70 mm and 45 mm.

The two pieces 102, 104 of baffle 100 are configured to be manually couplable together in a press fit by pushing two oppositely oriented halves together while the oppositely disposed rim 151 of each half 102, 104 faces the other rim 151. No rotation of the two pieces 102, 104 is required to effect their connection. Rather, pressing the two pieces 102, 104 together in a linear direction (toward each other) is required for connection.

Each baffle piece 102, 104 comprises male and female coupling parts 124, 122. Each female coupling part 122 defines a cavity within which the male coupling part 124 can be received. An internal coupling structure of each such part 122, 124 can latch together to couple the two pieces 102, 104 and thereby form the baffle 100. Once coupled together, the two pieces 102, 104 cannot be readily manually separated. Further, the connection of the two pieces 102, 104 may be designed to be permanent, in the sense that the two pieces 102, 104 may generally not be separable without breaking some part of the baffle 100. Alternatively, the two pieces 102, 104 may be designed to be separable only with the use of a special tool.

Figure 1:
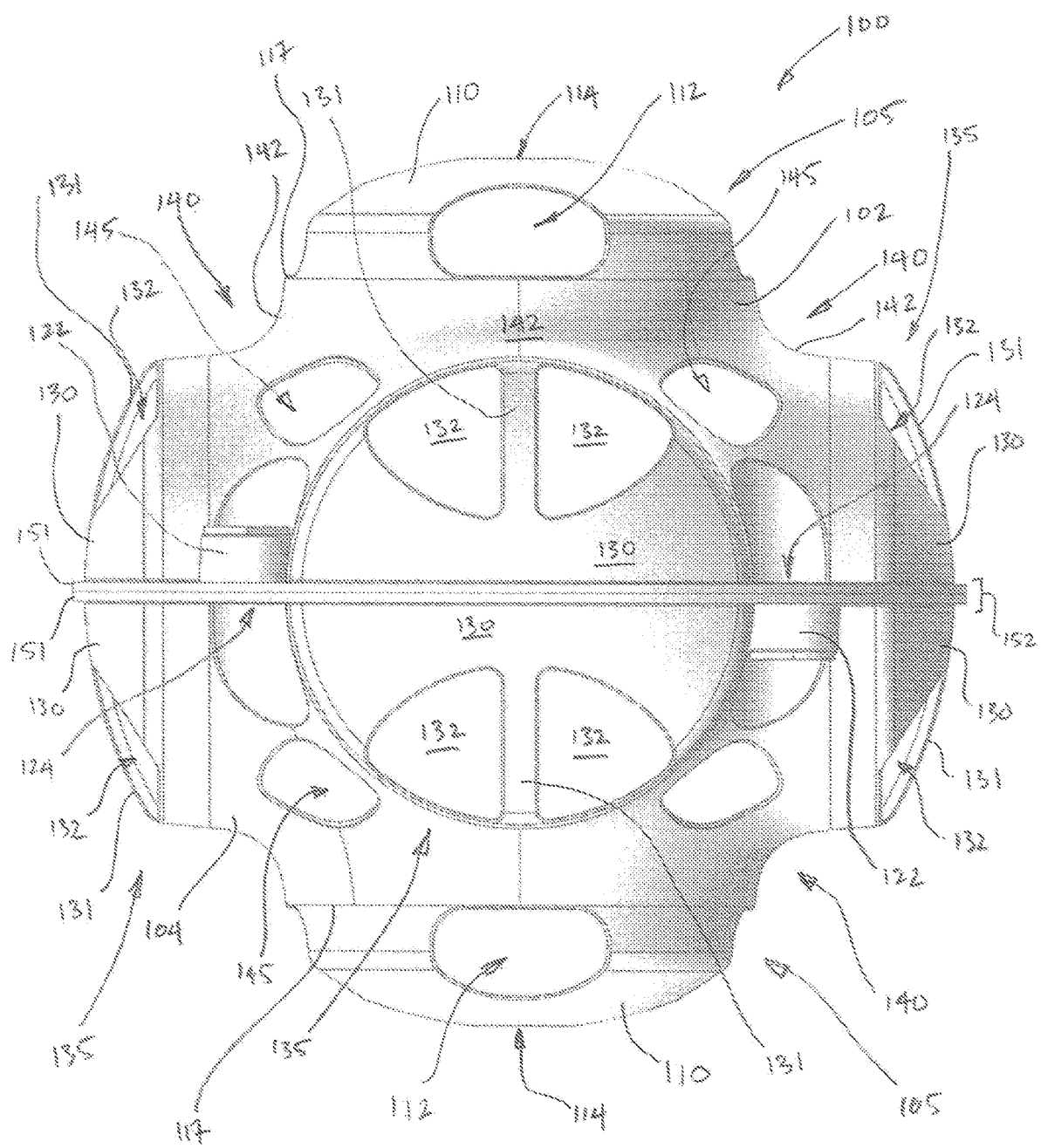
FIG. 1 is a side view of a fluid baffle according to some embodiments.
Figure 2:
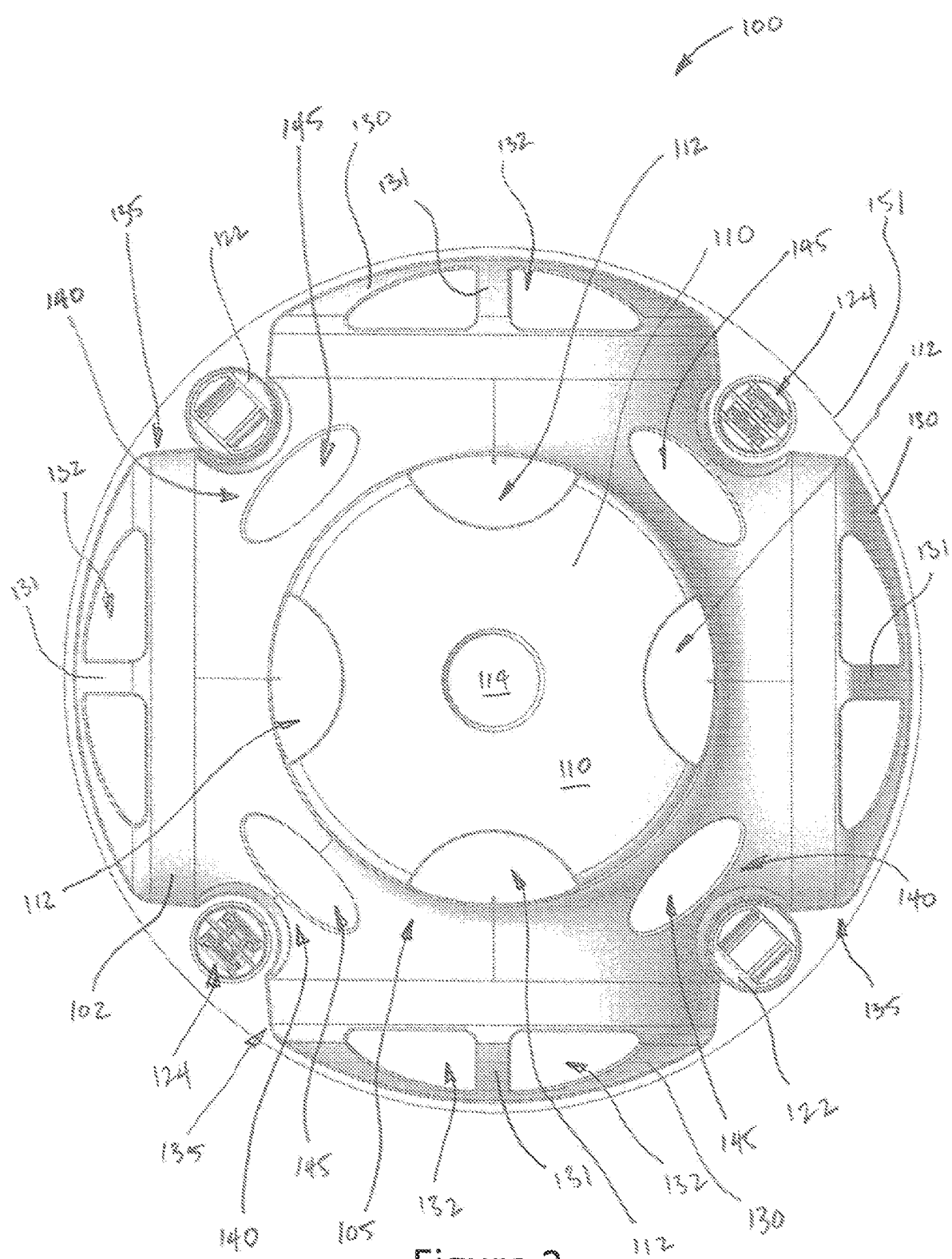
FIG. 2 is a top view of the fluid baffle of FIG. 1.
Figure 3:
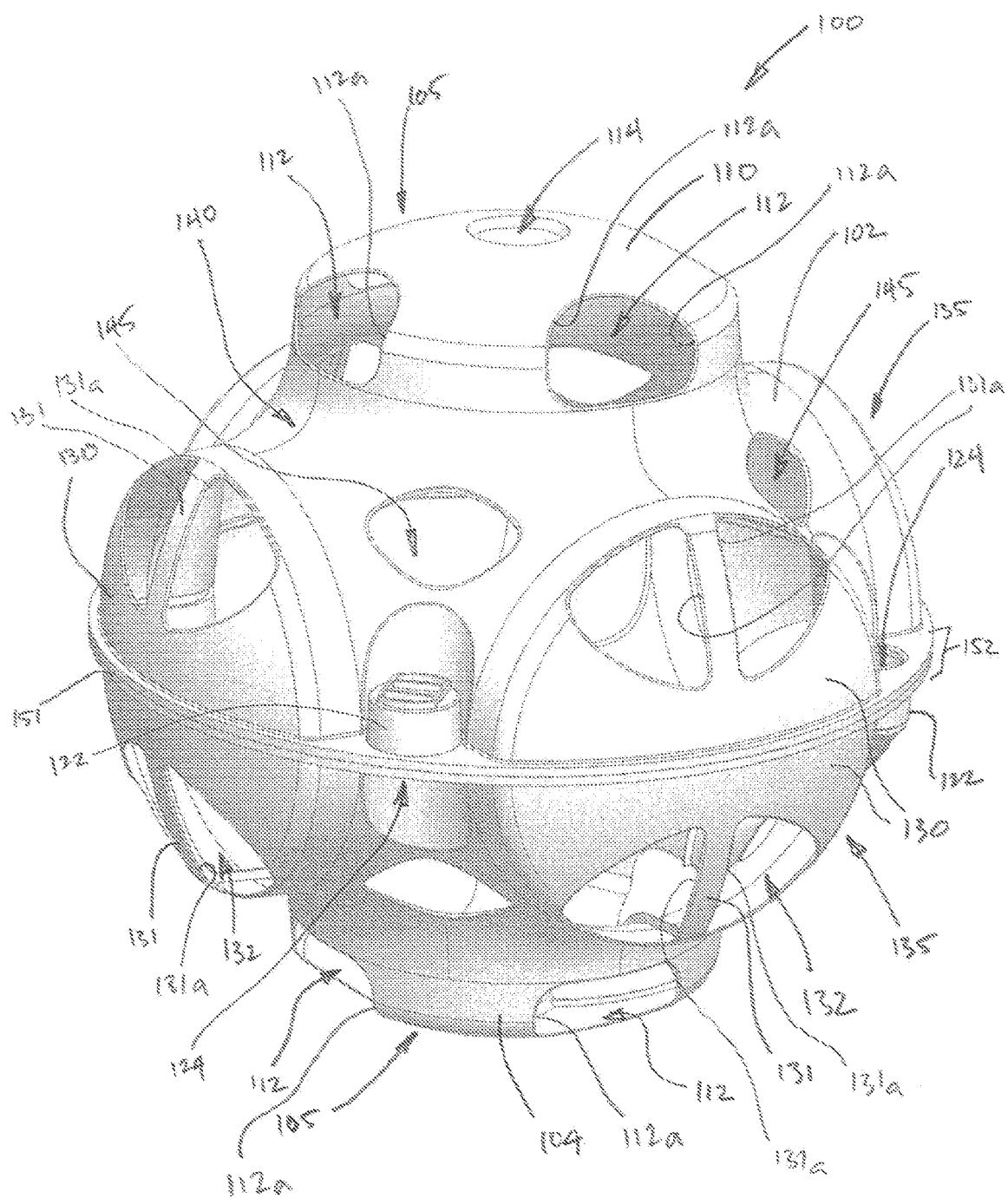
FIG. 3 is a top perspective view of the fluid baffle of FIG. 1.
Figure 4:
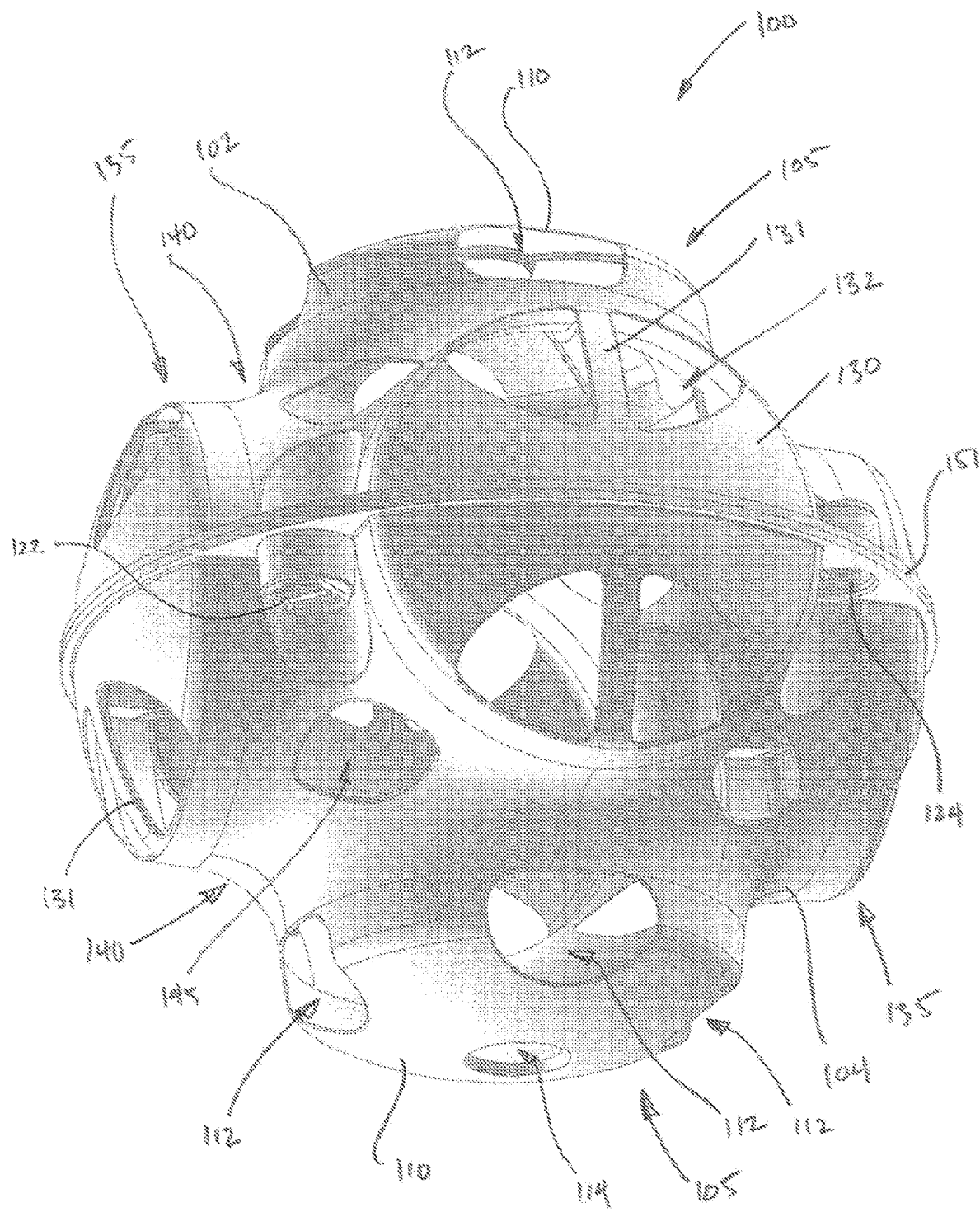
FIG. 4 is a bottom perspective view of the fluid baffle of FIG. 1.
Figure 5:
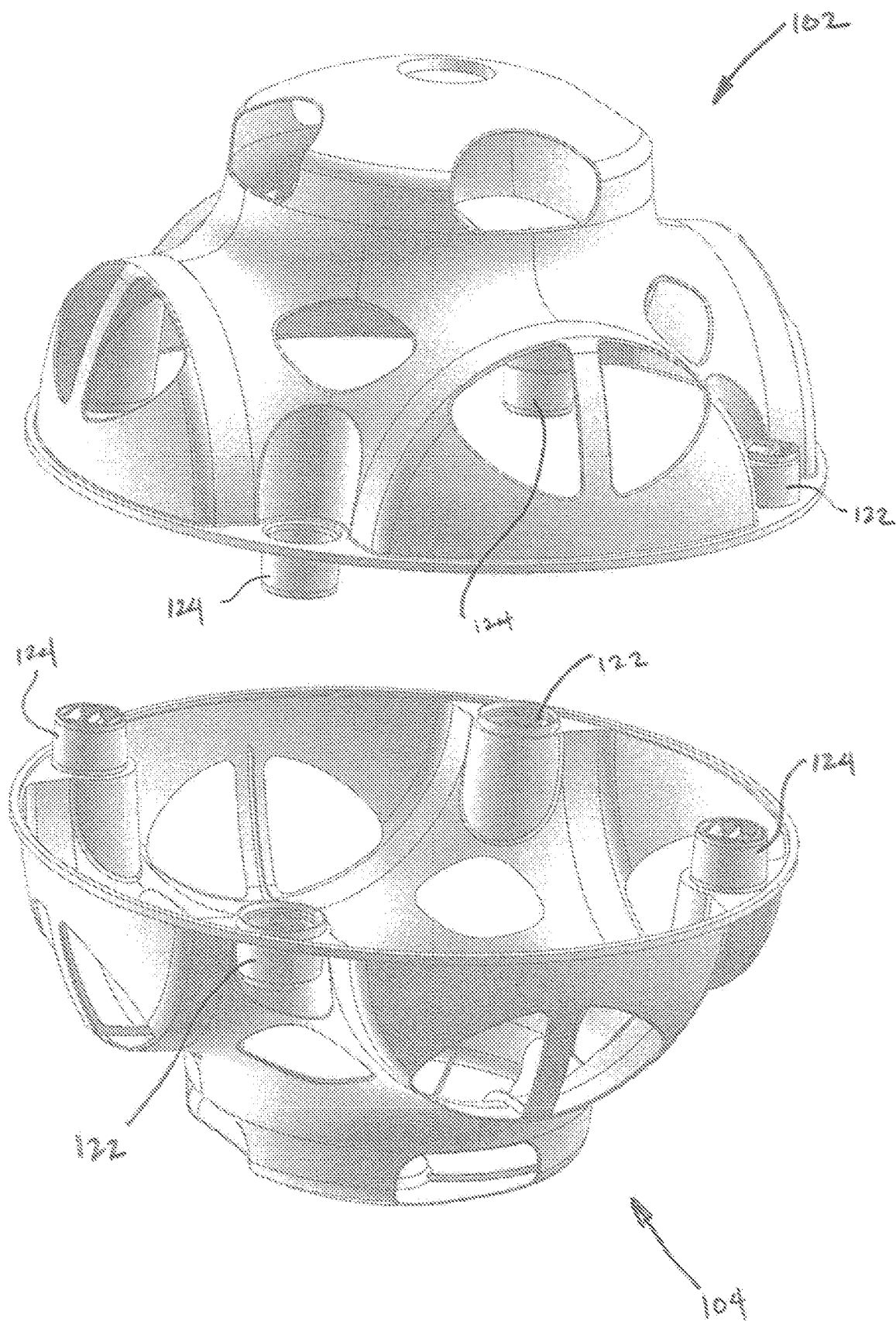
FIG. 5 is an exploded perspective view illustrating how two parts of the baffle can be coupled together.
Figure 6A:
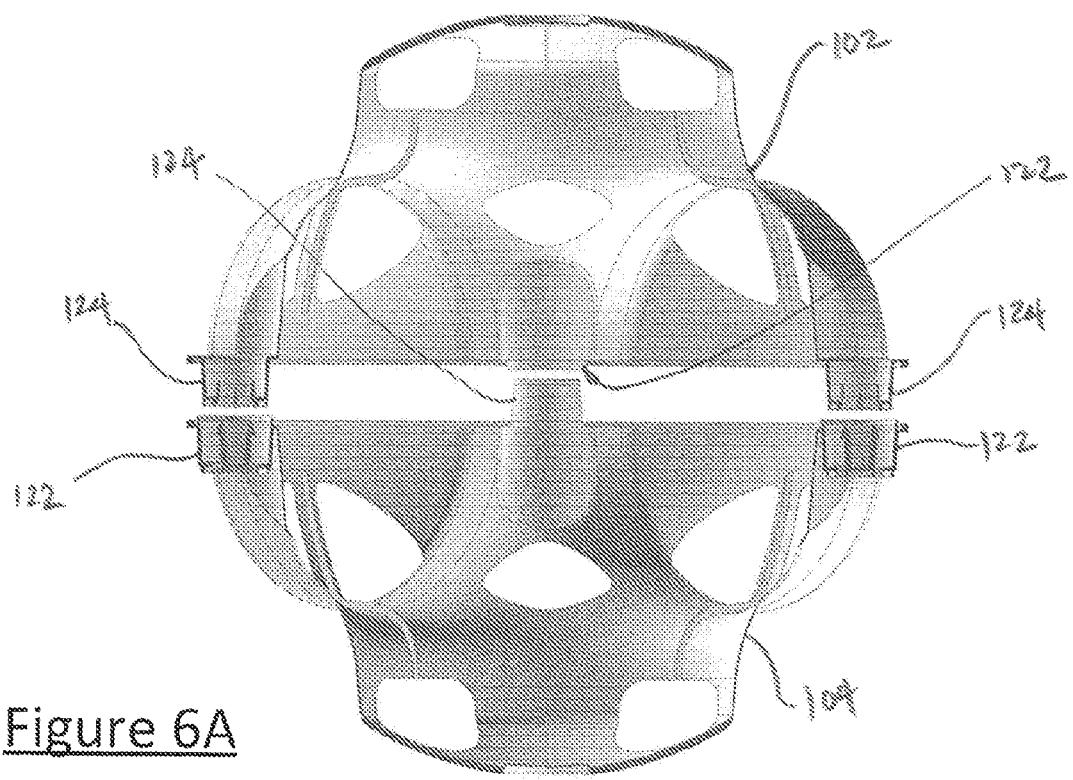
FIG. 6A is a side cross-sectional view of two parts of the fluid baffle of FIG. 1, illustrating how they can be coupled together.
Figure 6B:
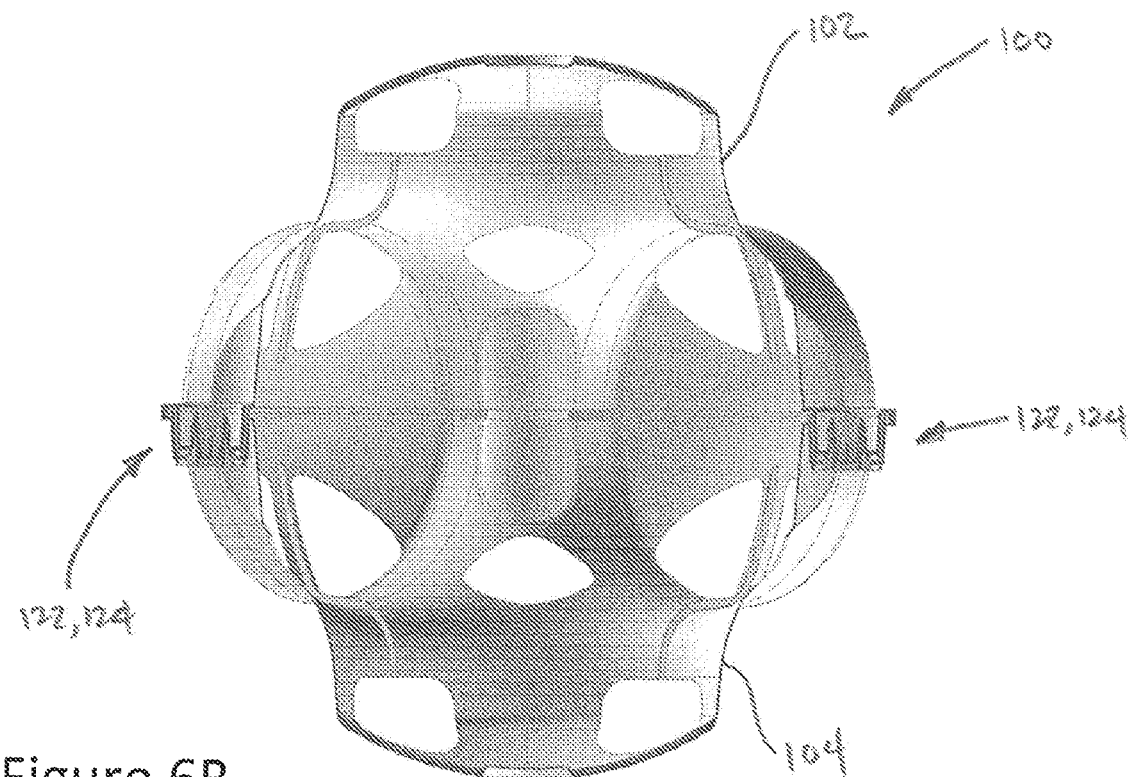
FIG. 6B is a further side cross-sectional illustrating completed assembly of the fluid baffle from the two parts.
Figure 7A:
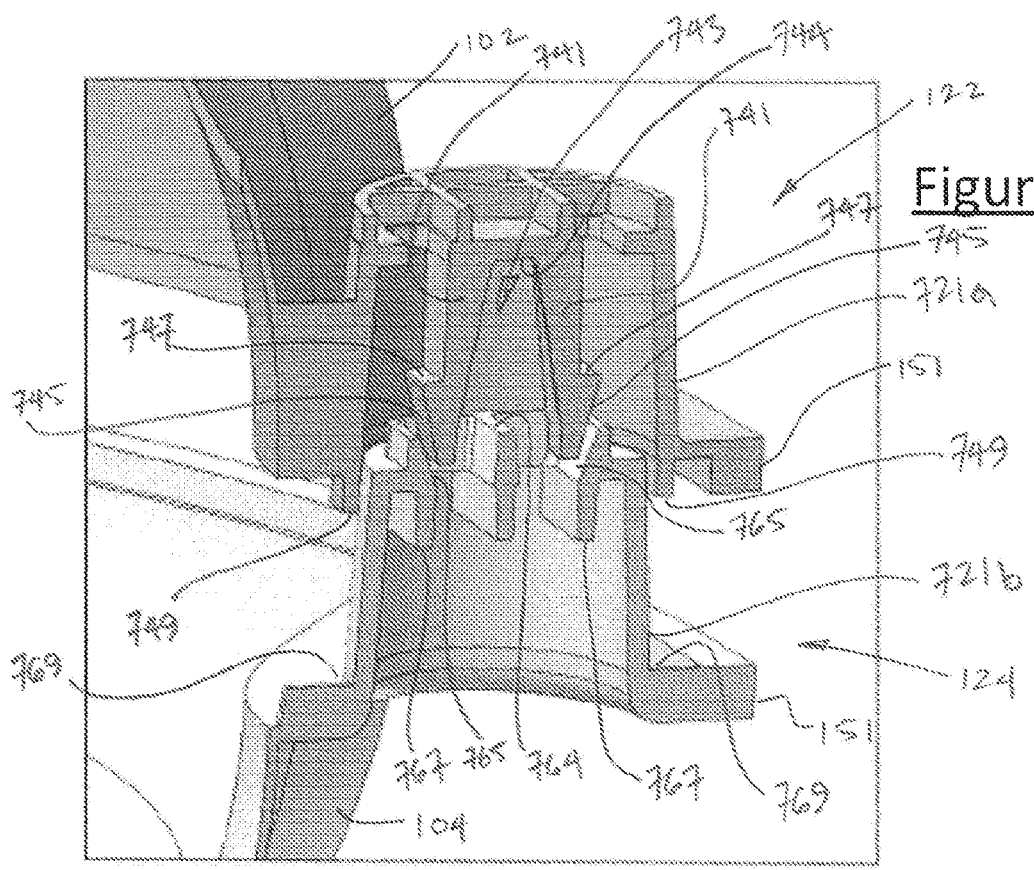
FIGS. 7A and 7B are close up perspective views of coupling components of the fluid baffle, shown in FIG. 7A prior to coupling and shown in FIG. 7B after coupling.
Figure 7B:
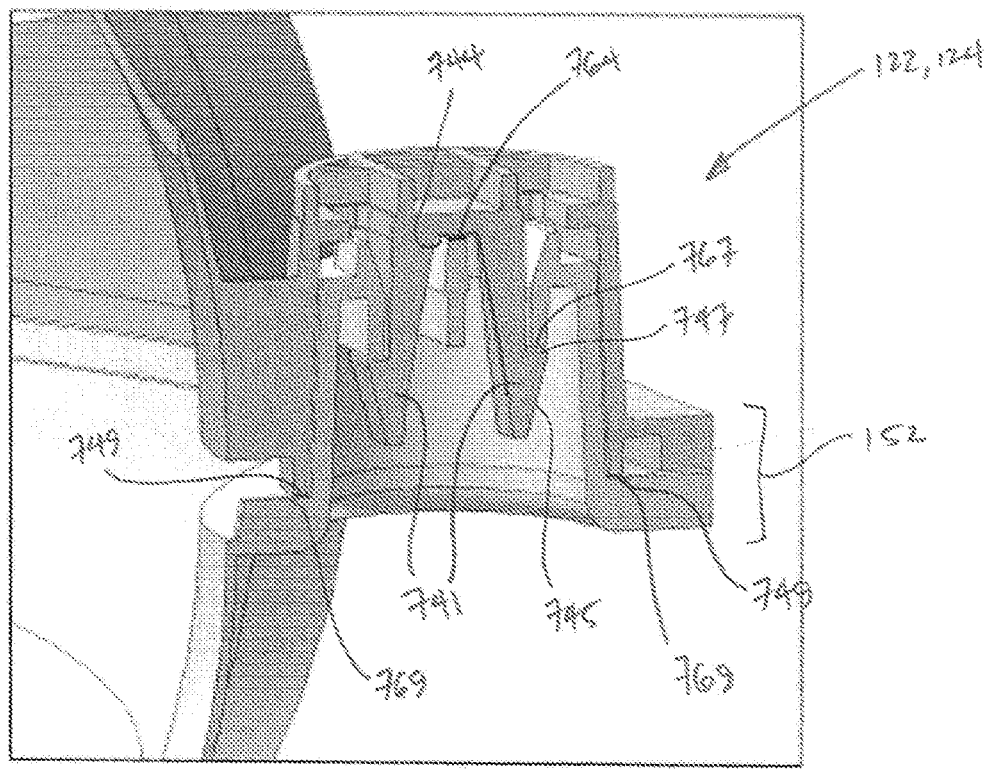

FIGS. 6A, 6B, 7A and 7B show how the coupling portions 122, 124 couple together. As best seen in FIGS. 7A and 7B, the female coupling portion 122 has deflectable arms 741 extending within a cavity defined by an outer wall 721a. Each of the deflectable arms 741 extends from an innermost base wall of the female coupling portion 122 toward an opening defined adjacent an edge wall 749. The deflectable arms 741 comprise distal end regions that define outer angled walls 745 adjacent a rearward facing shoulder portion 747. A space 743 is defined between the deflectable arms to allow inward flexion of the arms 741 and to allow receipt of a central portion of the male coupling portion 124 when the two parts are connected, as shown in FIG. 7B.

Male coupling portion 124 has an inwardly tapering wall 721b of a complementary taper to the wall 721a of the female coupling portion 122 so that, when the male coupling portion 124 is received within the interior of the female coupling portion 122, the walls 721b generally nest and mate inside the walls 721a.

As the coupling portions 122, 124 are brought together, the deflectable arms 741 are caused to inwardly deflect as the angled walls 745 contact and slide against inwardly angled walls 765 adjacent receiving apertures in the inner end section of the male coupling portion 124. Once the deflectable arms 741 are received through the openings in the inner end section of the male coupling portion 124 sufficiently far that the shoulder portions 747 pass the edge of an inward catch surface 767, the deflectable arms 741 resiliently deflect back outwardly so that the arms 741 adopt a latched position. In that latched position, shoulders 747 of the deflectable arms 741 overlie and abut the catch surfaces 767 and outer rim 749 abuts a base wall section 769 around the base of tapered walls 721b of the male portion 124. In this latched position, an upper surface 764 of the central portion of the male coupling portion 124 abuts an inner wall surface 744 of the female coupling portion 122, in between the two deflectable arms 741. In some embodiments, the deflectable arms may have reinforcement ribs on interior walls that define space 743. Such reinforcement ribs may act to strengthen the arms 741 against inward deflection to thereby require greater force to assemble the two pieces 102, 104 and/or greater force to resist manual inward compression, for example to make manual decoupling more difficult.

Because of the described connection configuration, the male and female coupling portions 122, 124 do not readily come apart once they have been forced into the latched position. In some embodiments it may be possible to manually inwardly deflect the deflectable arms 741 sufficiently to allow them to be withdrawn from the apertures through which they were received. However, the hardness of the material of the deflectable arms 741 may be selected to minimise the practical likelihood of decoupling the male and female coupling portions 122, 124 once they are coupled together.

FIGS. 11A, 11B, 12A, 12B, 13, 14, 15 and 16 illustrate a fluid baffle 1100 according to some embodiments. Fluid baffle 1100 is identical to fluid baffle 100 in many respects and differs in only a few ways. The principal ways in which fluid baffle 1100 differs from fluid baffle 100 is in: the addition of further location and alignment parts 1136, 1138 adjacent the rim region 152; a concave wall section 1134 aligned with the alignment parts 1136, 1138; the inclusion of drainage apertures 1135 and 1126 in areas of the baffle that may tend to act like pockets that retain fluid in certain orientations; and in an illustrative alternative set of top openings 1114 that are of a non-circular shape (as compared to the circular shape of top opening 114).

Figure 17:
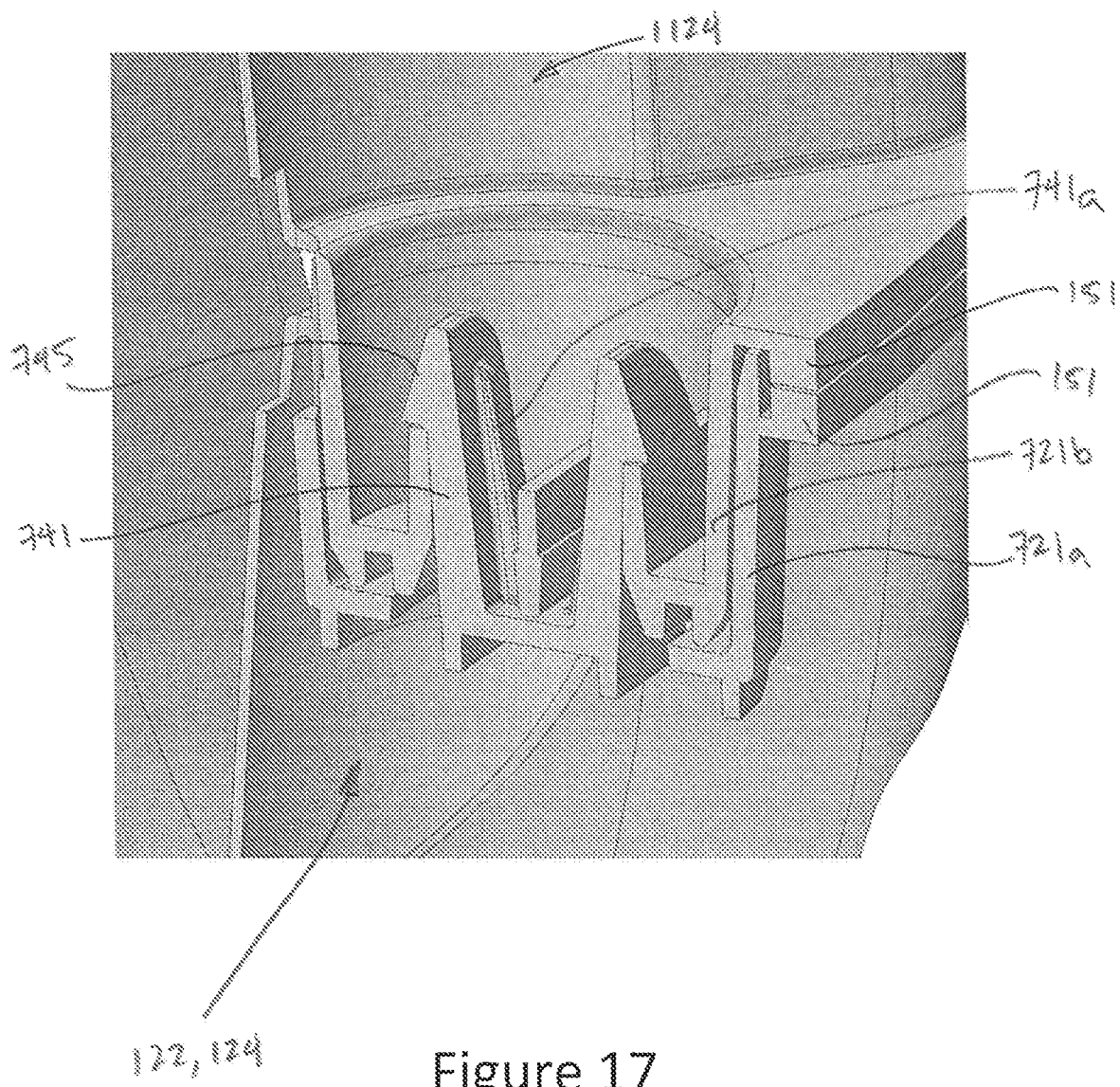
FIG. 17 is a close-up perspective sectional view of coupling components of a fluid baffle according to further embodiments.

As best seen in FIGS. 11B, 12A, 12B and 13, fluid baffle 1100 is formed of two parts, a first part 1102 and a second part 1104. In some embodiments, first and second parts 1102, 1104 are identically formed and shaped. However, in other embodiments, the first part 1102 may have differing contours, aperture sizes, wall shapes or other configurations, as compared to second part 1104, while still permitting the first and second parts 1102, 1104 to couple together, as illustrated with respect to FIGS. 7A, 7B and 17. While first part 1102 and second part 104 need not be identical, such identicality allows for the parts to be nested, such as is illustrated in FIG. 10. The two pieces 1102, 1104 may be manually pressed together when in the facing orientation shown in FIG. 5.

In baffle 1100, first piece 1102 is the same as second piece 1104, except that they are coupled together in a mirror image fashion, with one of the pieces forming a top piece and the other a bottom piece, although such top and bottom orientation is arbitrary and only used here for description purposes. Each baffle part 1102, 1104 defines a domed portion 1110 at a top or bottom and a series of half domes 1130 at spaced positions around the sides of the baffle 1100 adjacent the coupling rim 151.

The half domes 1130 combine across the rims 151 of the connected halves of baffle 1100 to form generally convex domed side portions of approximately similar curvature and convexity (other than central concave areas 1134) to the convex domed portions 110 or 1110. In between the domed portions 1110, 1130, the body of each baffle half 1102, 1104 is recessed relative to those domed portions 1110, 1130. There are recessed areas, portions or regions 140 between each of the neighbouring side domed portions 1130, as well as between each of those side domed portions and the top and bottom domed portions 1110. The walls of the baffle halves 1102, 1104, are formed to provide a relatively smooth transition between the domed portions 1110, 1130 and the recessed portions or regions 140 therebetween.

In contrast to the domed portions 1110, 1130, the recessed portions or regions 140 curve and transition into one another across the body of the body half 1102 or 1104. The domed portions 1110, 1130 are not continuous with each other and are generally divided from each other by the recessed portions or regions 140. Because of the curved transition of the recessed portions or regions 140 across the baffle halves 1102, 1104, saddle regions 142 may be formed in some parts of the recessed areas or regions 140.

A number of fluid passage apertures are formed in and defined by the top and bottom baffle pieces 1102, 1104. These apertures include, but are not limited to: a top aperture 1114 defined toward an outer apex of convex domed portion 1110; top side apertures 112 (that are essentially the same or similar to those of fluid baffle 100 and) that are radially spaced from the top aperture 1114 and interrupt the transition of the domed portion 1110 toward the surrounding and adjacent recessed area 140; side apertures 1132 defined in the side domed portions 1130; and recessed apertures 145 defined in the recessed areas or regions 140 and/or saddle regions 142 (as described in relation to fluid baffle 100). The above-described fluid passage apertures are all sized to be large enough to readily permit the flow of liquids therethrough without restriction, where such liquids have a viscosity approximately similar to (i.e., within about 50%) the viscosity of water, for example. Such fluid passage apertures may have regular or irregular shapes and may have dimensions ranging from 10 mm to 100 mm across, for example.

For baffle 1100, it is desirable to have a balance between the surface area defined by the wall material of the baffle and the apertures defined therebetween, so that there is enough wall material to have a flow interruption effect, but not so much wall material that the liquid in the tank cannot readily flow into and out of the interior volume of the baffle 1100 or so that the liquid does not readily drain from the interior volume.

Recessed apertures 145 may be approximately diamond shaped or generally circular, for example. Side apertures 1132 may be defined by each half domed portion 1130 such that there are two such side apertures 1132 in each half domed portion 1130. Such side apertures 1132 may be positioned to be separated by a web or strip 1131 that partially defines the domed portion 1130 and extends from an area adjacent the rim region 152 toward one of the saddle regions 142. The form of the web or strip 1131 generally follows the contour of the domed portion 1130, but because of the presence of the side apertures 1132 on each lateral side of the web or strip 1131, side edges (like those shown as 131a in FIG. 3) of the strip 1131 can play a more prominent catching or interfering role as adjacent baffles 1100 move against each other. Similarly, the side edges (like those shown as 112a in FIG. 3) defined by top side apertures 112 are configured to promote catching and interference with walls and edges of adjacent baffles 1100.

The two pieces 1102, 1104 of baffle 1100 are configured to be manually couplable together in a press fit by pushing two oppositely oriented halves together while the oppositely disposed rim 151 of each half 1102, 1104 faces the other rim 151. No rotation of the two pieces 1102, 1104 is required to effect their connection. Rather, pressing the two pieces 1102, 1104 together in a linear direction (toward each other) is required for connection.

Each baffle piece 1102, 1104 comprises male and female coupling parts 124, 122 as described above in relation to fluid baffle 100. The connection of the two pieces 1102, 1104 may be designed to be permanent, in the sense that the two pieces 1102, 1104 may generally not be separable without breaking some part of the baffle 1100. Alternatively, the two pieces 1102, 1104 may be designed to be separable only with the use of a special tool.

Alignment parts 1136, 1138 may be formed as a projecting part 1136 (e.g., of a male form) and a recessed part 1138 (e.g., of a female form). The projecting part 1136 may define an end aperture 1137 and the recessed part 1138 may define an end aperture 1139. When the projecting part 1136 is received in the recessed part 1138, the end apertures 1137 and 1139 are generally aligned in order to allow fluid passage therethrough to avoid retaining liquid in or around the alignment parts 1136, 1138. The projecting part 1136 has slightly inwardly tapering walls as it extends away from a generally flat area of the rim 151. The recessed portion 1138 has similarly tapered and complementary walls to receive and accommodate the tapered walls of the projecting part 1136.

Figure 14:
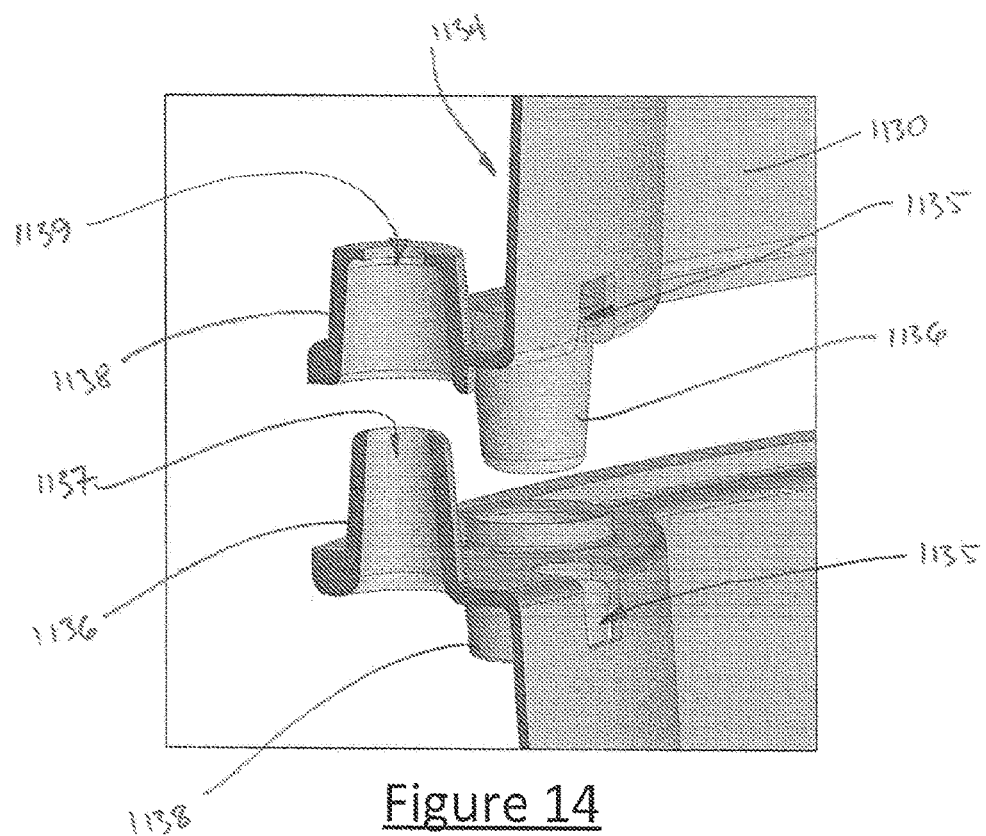
FIG. 14 is a close-up perspective sectional view of location components of the baffle of FIG. 11A, showing how they fit together.
Figure 16:
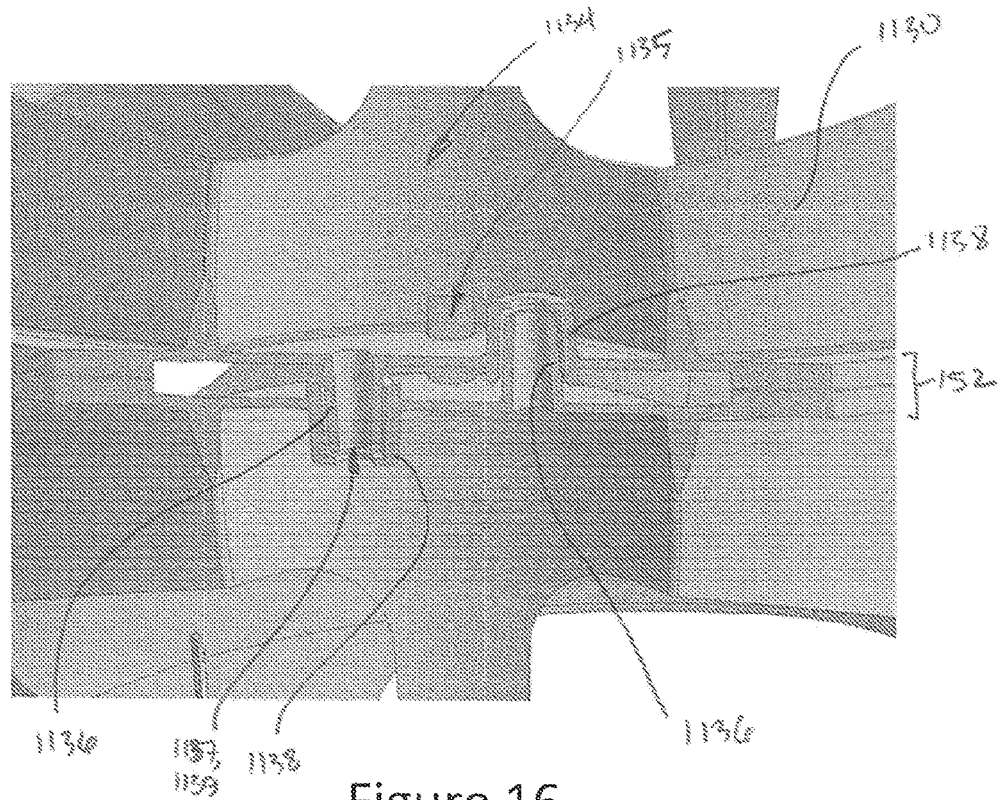
FIG. 16 is a close-up perspective sectional view of location components of the baffle of FIG. 11A, showing how they fit together.

As shown best in FIGS. 14 and 16, alignment parts 1136, 1138 are provided in pairs of opposite projection orientations and in close proximity to each other adjacent the rim region 152. The side domed portion 1130 may have a concave wall section defining the concave area 1134. The concave area 1134 is recessed somewhat away from the rim region 152 in order to allow space for formation (e.g. during moulding) of the alignment parts 1136, 1138. Drainage apertures 1135 are formed as small slotted holes (for example, having a maximum width of about 5-10 mm) defined by a base section of the concave wall defining concave area 1134 where that concave wall meets a flat area contiguous with the rim 151. Similarly, drainage apertures 1126 are formed as small slotted holes (for example, having a maximum width of about 5-10 mm) defined by a base section of a concave wall section 1124 adjacent the coupling portion 122 or 124 where that concave wall meets a flat area contiguous with the rim 151.

Figure 11A:
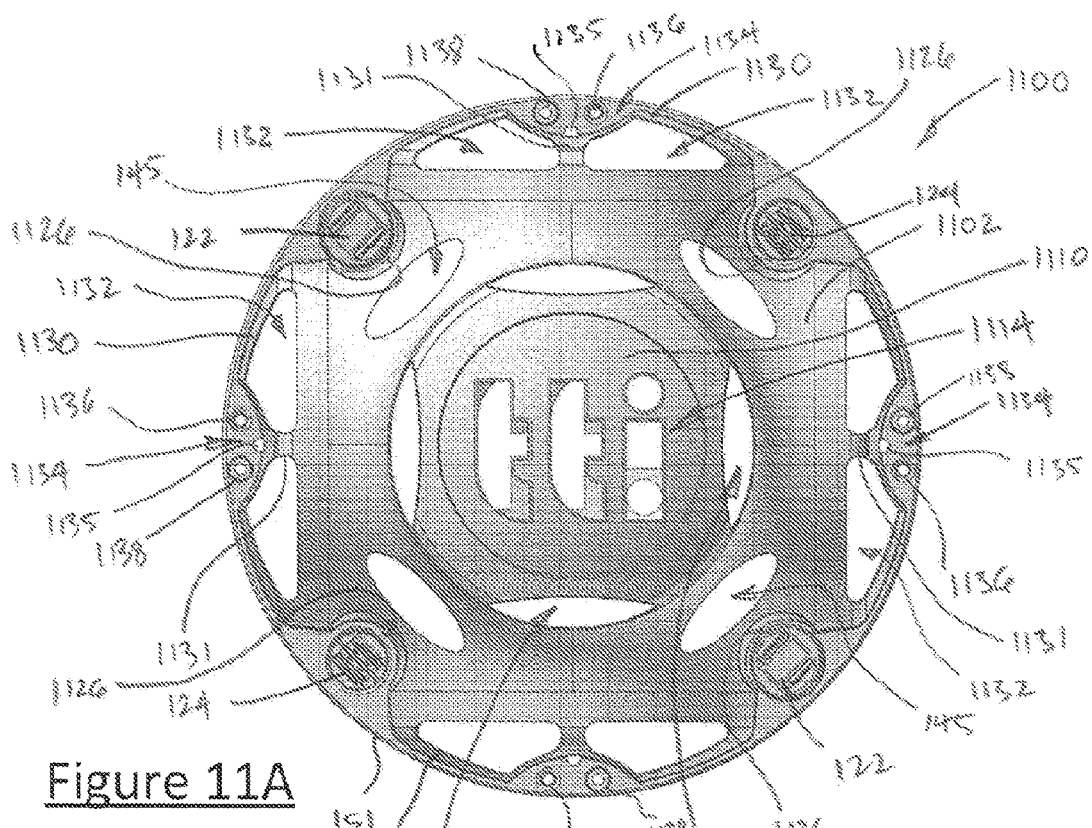
FIG. 11A is a top view of a fluid baffle according to some embodiments.
Figure 11B:
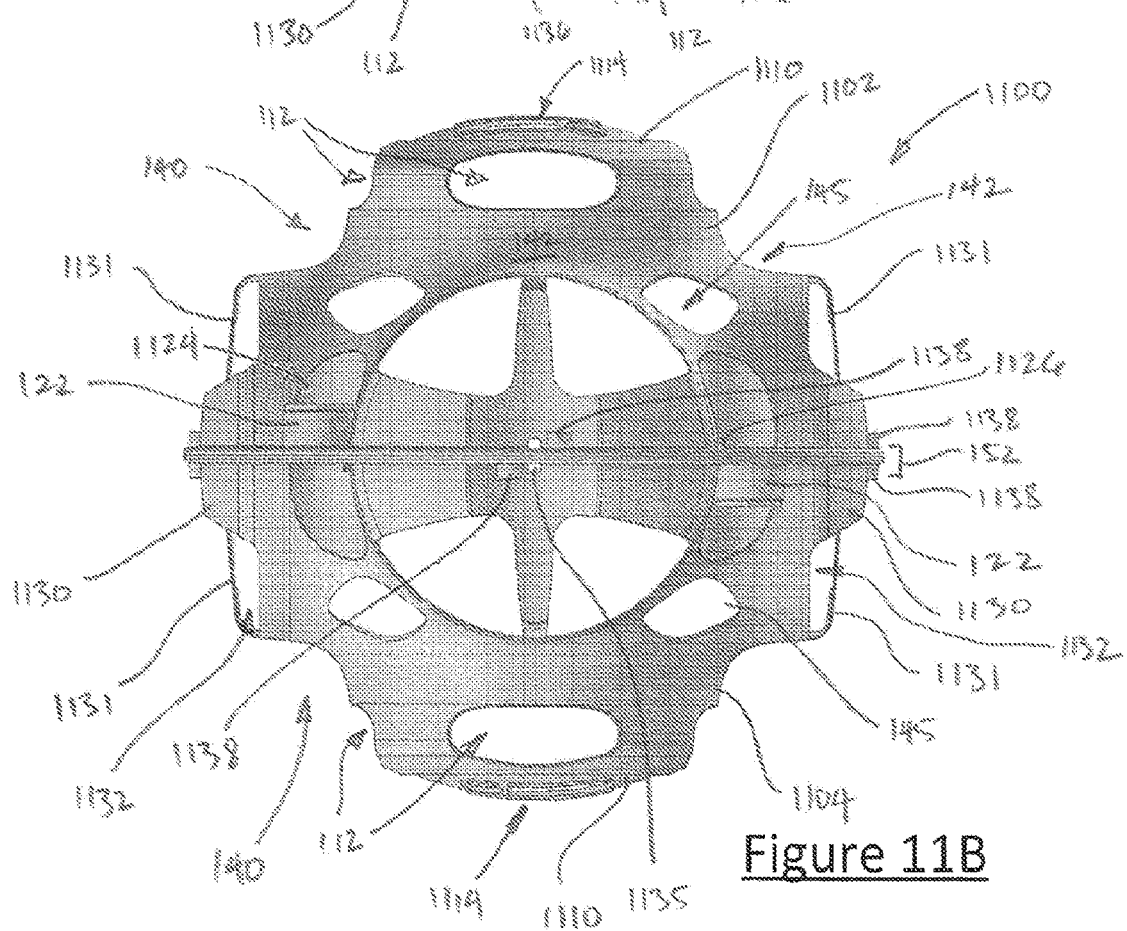
FIG. 11B is a side view of the baffle of FIG. 11A.
Figure 12A:
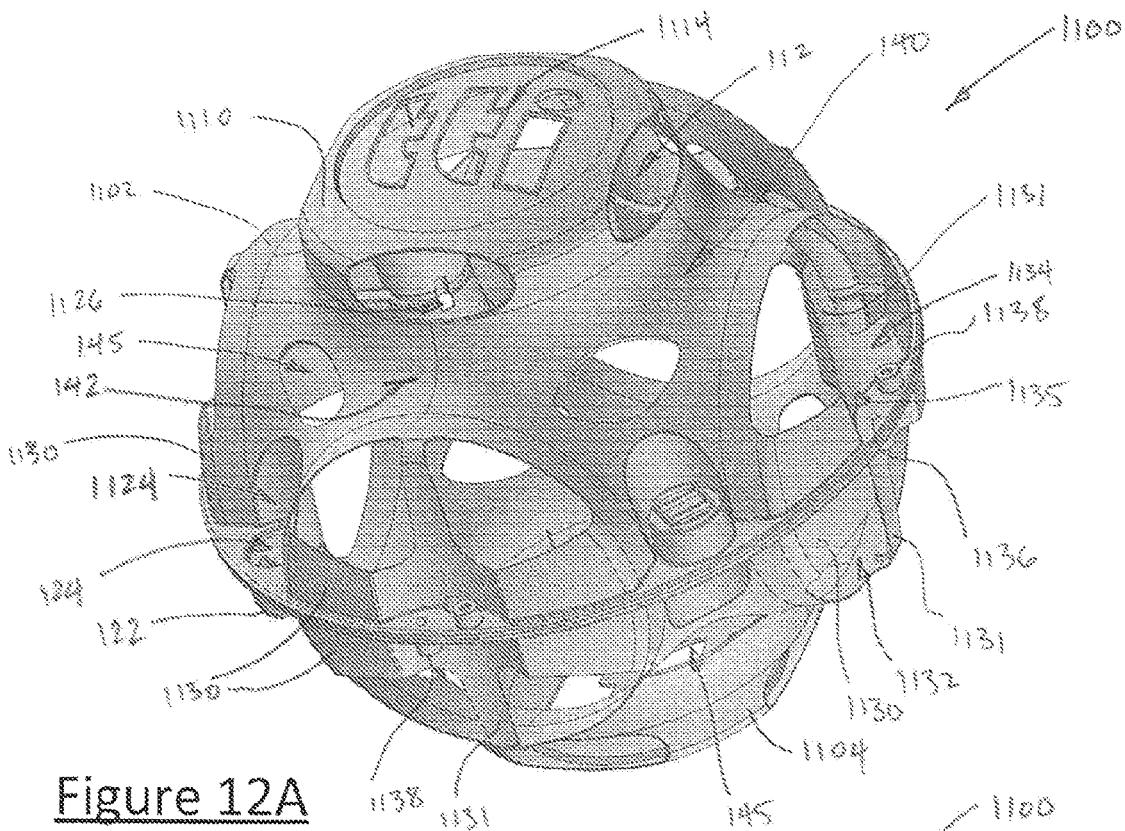
FIG. 12A is a top perspective view of the baffle of FIG. 11A.
Figure 12B:
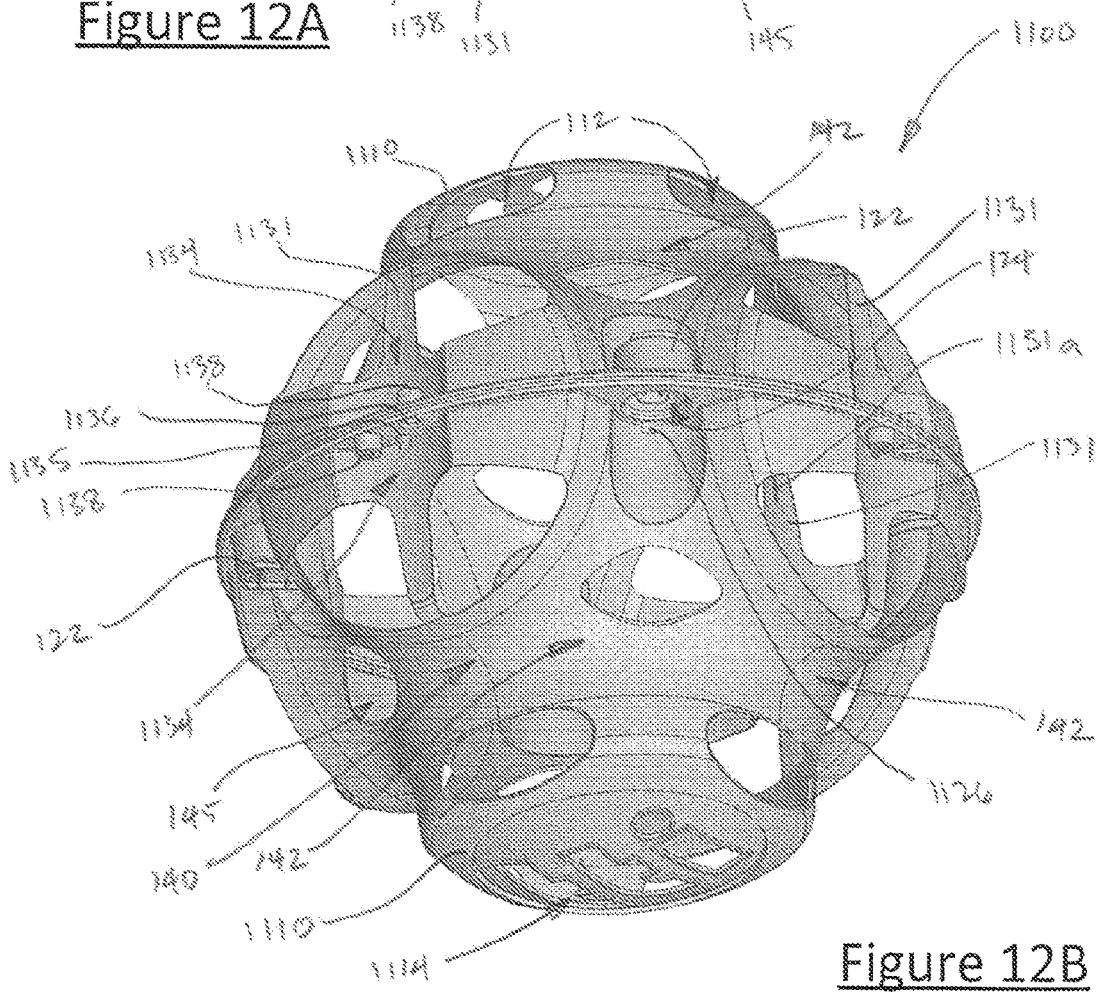
FIG. 12B is a bottom perspective view of the baffle of FIG. 11A.

The pairs of alignment parts 1136, 1138 may each be positioned adjacent side projecting portions 1130 and therefore four such pairs can be positioned at four spaced locations about the rim region 152. The pairs of alignment parts 1136, 1138 may each be about 90 degrees apart from each other around the circumference and about 45 degrees apart from each neighbouring male and female coupling structure 122, 124. As is best seen in FIGS. 11A and 12A, the top and bottom domed portions 1110 define apertures 1114 therein to allow fluid passage therethrough in a similar manner to the other fluid passage apertures described herein. The fluid passage apertures 1114 may be defined as multiple distinct apertures of irregular shape spaced across the upper domed face of domed portion 1110. In the examples shown, the top and bottom fluid passage apertures 1114 are shaped to mimic a company logo.

Figure 13:
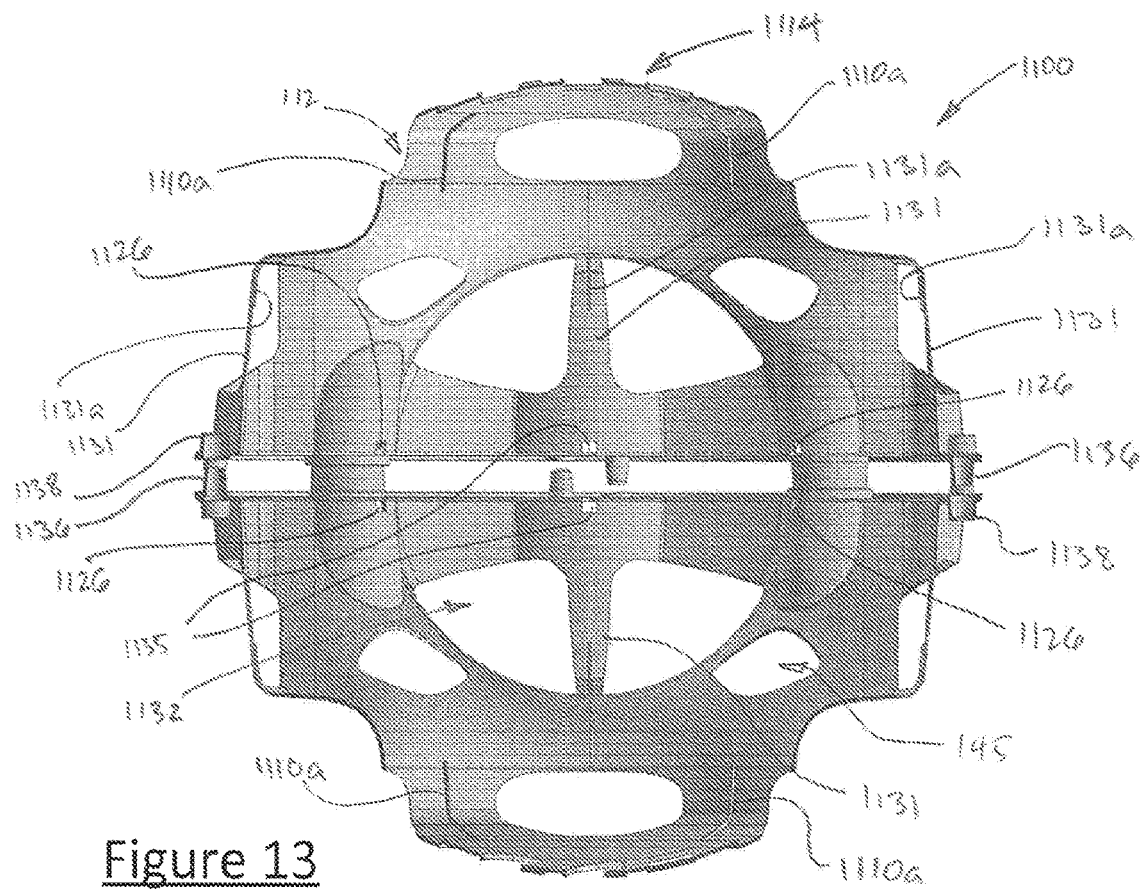
FIG. 13 is a side cross-sectional view of the baffle of FIG. 11A, showing two pieces of the baffle as they are about to be coupled together.
Figure 15:
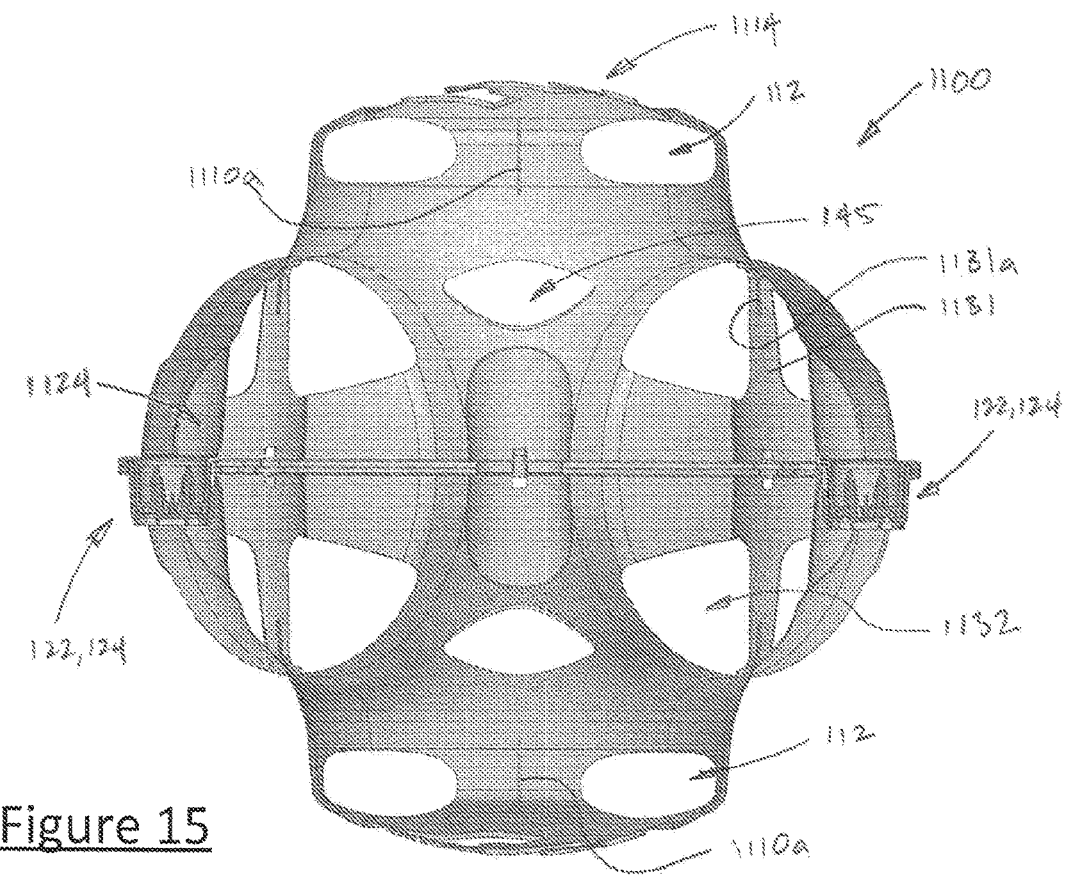
FIG. 15 is a side cross-sectional view of the baffle of FIG. 11A, with the two pieces coupled together.

As is visible in FIGS. 13 and 15, some parts of the fluid baffle 1100 comprise internal moulded reinforcement ribs. For example, the top and bottom domed portions 1110 have internal reinforcement ribs 1110a extending internally along wall sections of domed portion 1110 circumferentially in between fluid passage apertures 1112. Such reinforcement ribs add structural rigidity and aid in resisting deformation of the domed portions 1110 under load. Further, web or strip 1131 also has an internal reinforcing rib 1131a in the region toward where the web or strip 1131 transitions and bends from the concave area 1134 toward an adjacent recessed region 140. Again, structural reinforcement ribs 1131a can assist in resisting deformation of the web or strip 1131. Such internal reinforcement ribs 1131a, 1110a can be readily moulded as part of the injection moulding process when forming the first and second parts 102, 104 and 1102, 1104.

Various embodiments of the fluid baffles described herein may be formed of various sizes and with some variation as to angles or radiuses of curvature in certain areas and some variation as to exact location and size of the fluid passage apertures. However, it is generally desired that the baffles have a maximum diameter (e.g., defined by the rims 151) that is less than 380 mm. For example, the maximum diameter may be 375 mm, 370 mm or less but may have a minimum diameter of say 100 mm, for example.

The walls of the baffle embodiments described herein may have a nominal wall thickness of around 1 mm in most areas other than where reinforcement ribs or coupling structures are present. However, some variation of this wall thickness is permissible for the embodiments disclosed herein and the wall thickness may vary to as little as 0.8 mm and as much as about 1.5 mm in different embodiments. The walls of the fluid baffle halves 102, 104, 1102, 1104 described herein are generally integrally formed (in each piece) and continuous and uninterrupted, except by the fluid passage apertures and drainage apertures described herein.

FIGS. 18A, 18B, 19A and 19B illustrate a fluid baffle 1800 according to some embodiments. Fluid baffle 1800 is similar to fluid baffles 100 and 1100 in many respects and differs in only a few ways. The principal ways in which fluid baffle 1800 differs from fluid baffle 1100 is: in an illustrative alternative coupling structure of the coupling portions 122, 124; in illustrative alternative sets of top openings 1814 and top side openings 1812; and in a lack of any apertures in the recessed portions 140.

Figure 18A:
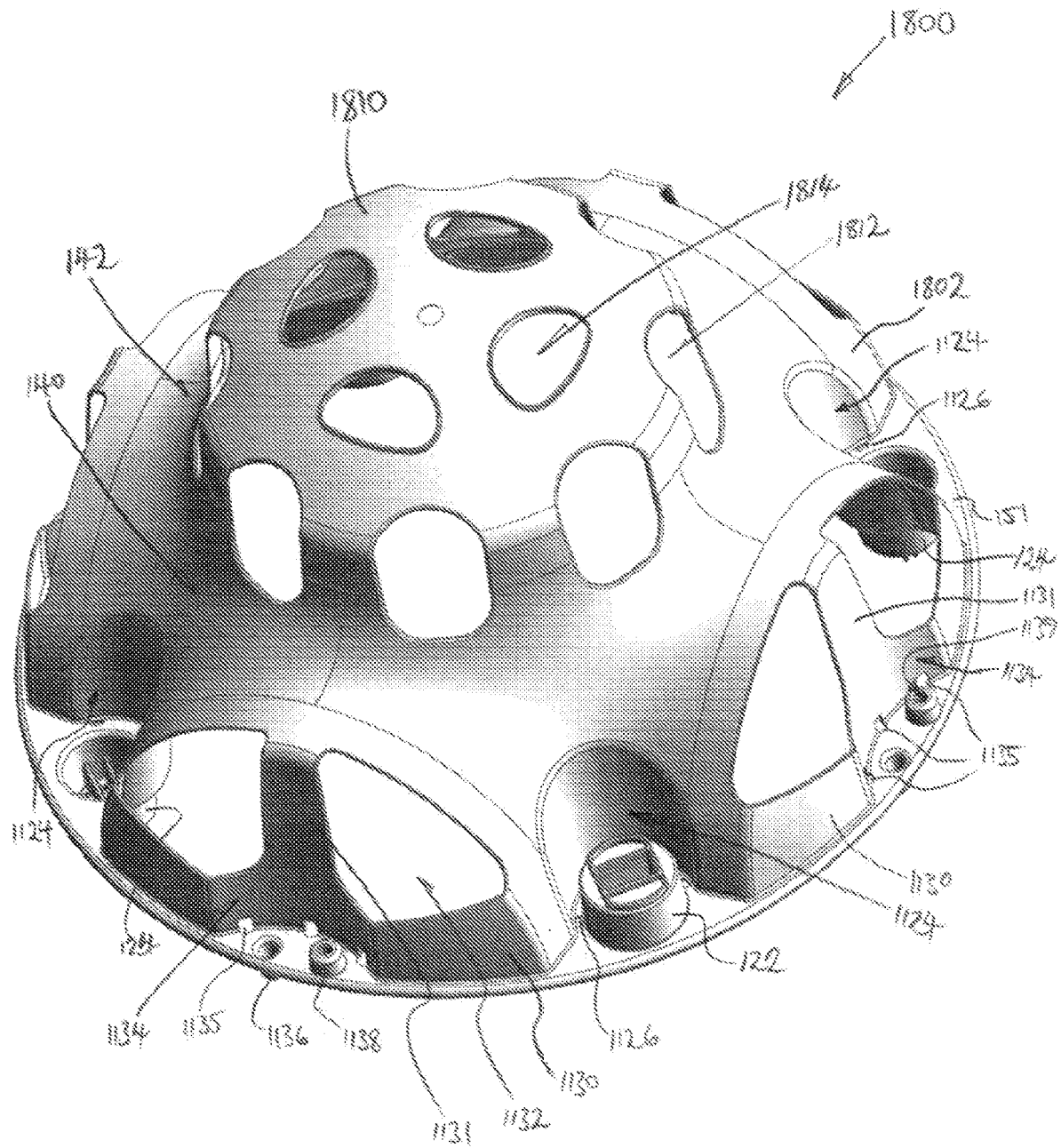
FIG. 18A is a top perspective view of one part of a fluid baffle according to further embodiments.
Figure 18B:
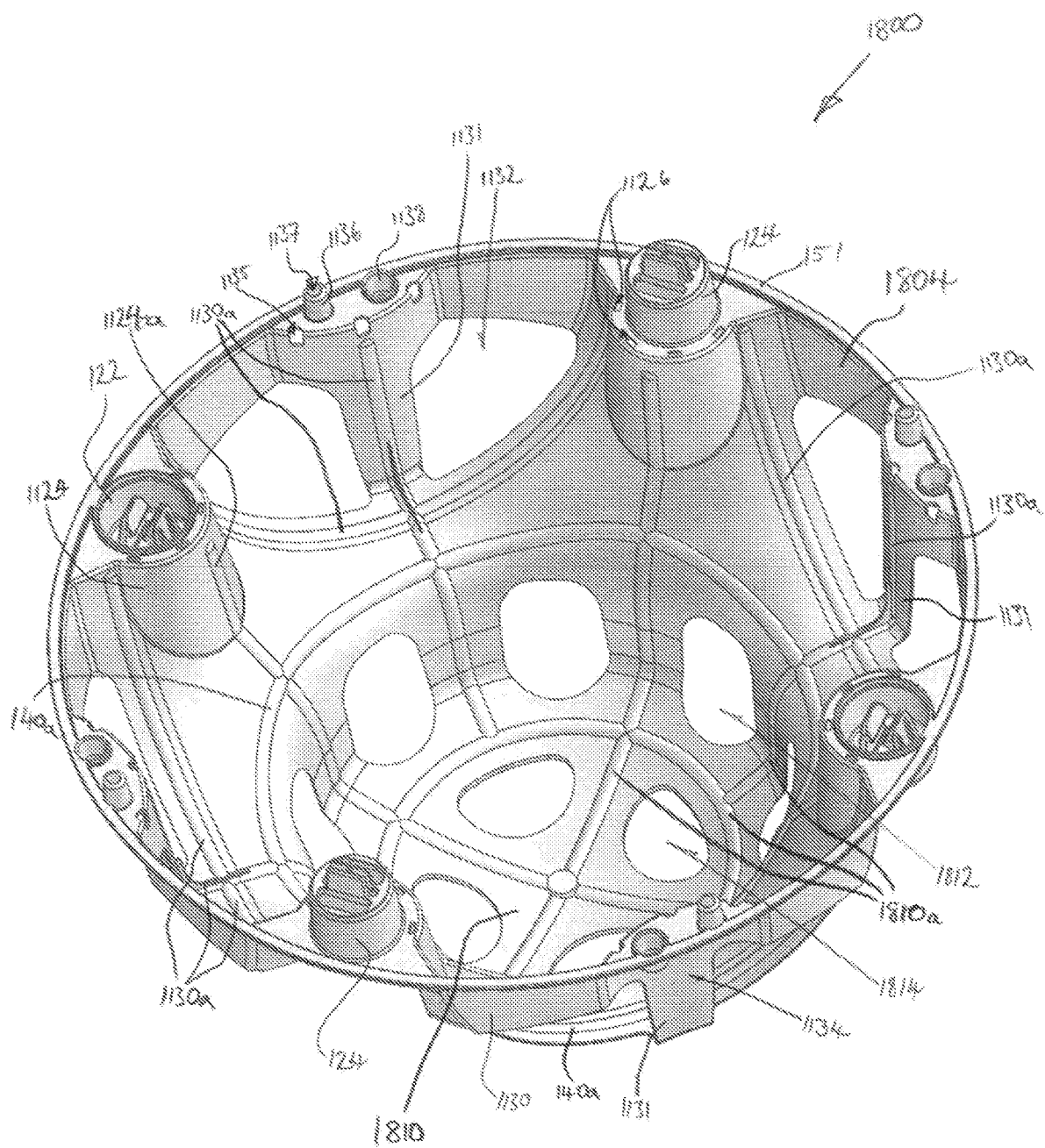
FIG. 18B is a bottom perspective view of the fluid baffle part of FIG. 18A.
Figure 19A:
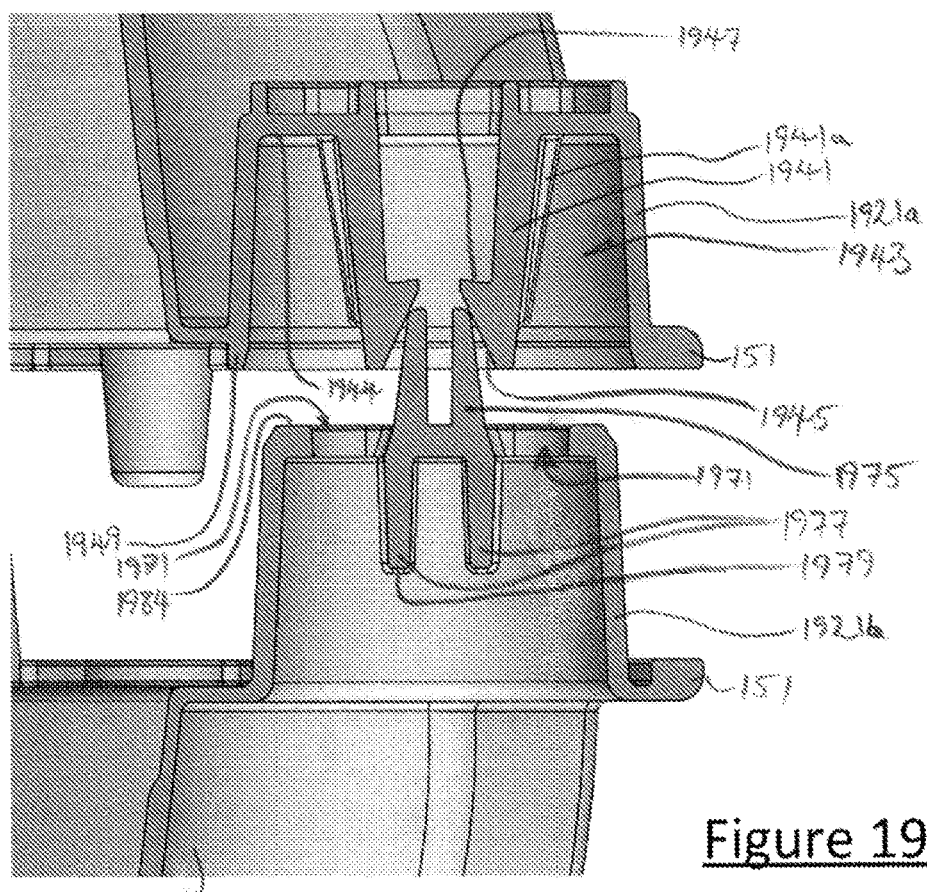
FIG. 19A is a close-up side cross-sectional view of two fluid baffle parts of FIG. 18A, showing coupling portions of the two parts of the baffle as they are about to be coupled together to form the baffle.
Figure 19B:
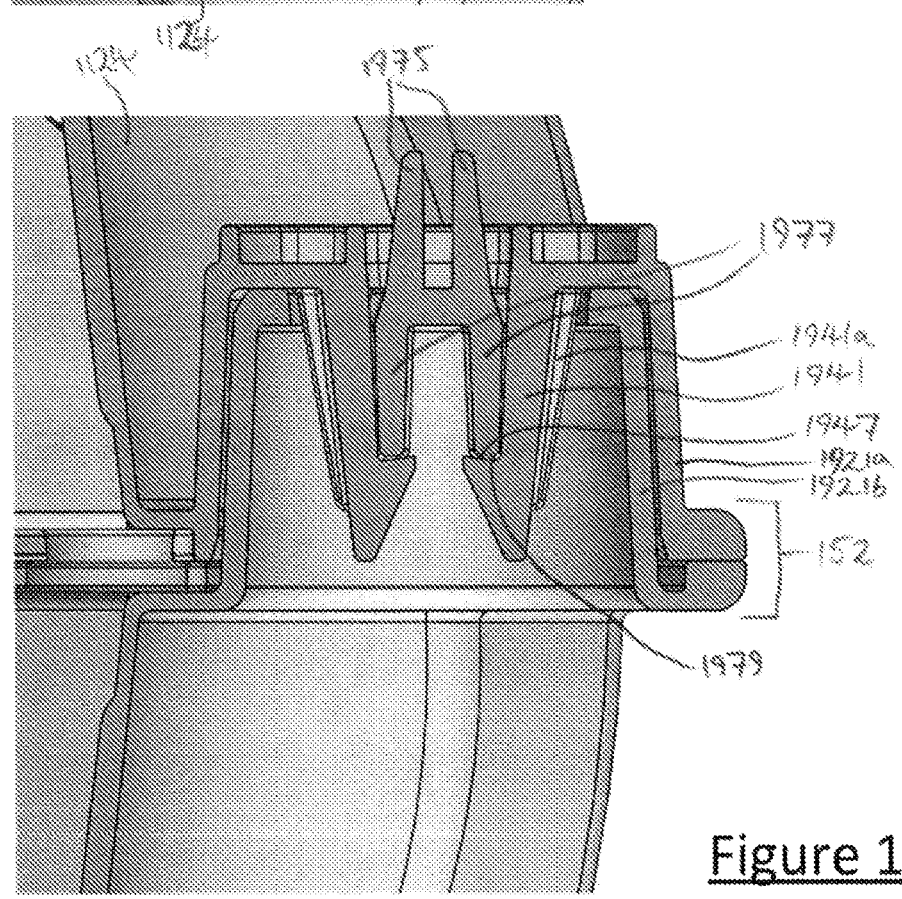
FIG. 19B is a close-up side cross-sectional view of two fluid baffle parts of FIG. 18A, showing coupling portions of the two parts of the baffle once they coupled together to form the baffle.

As best seen in FIGS. 18A and 18B, fluid baffle 1800 is formed of two parts, a first part 1802 and a second part 1804. In some embodiments, first and second parts 1802, 1804 are identically formed and shaped. However, in other embodiments, the first part 1802 may have differing contours, aperture sizes, wall shapes or other configurations, as compared to second part 1804, while still permitting the first and second parts 1802, 1804 to couple together, as illustrated with respect to FIGS. 7A, 7B and 17, or with the alternate coupling structures of coupling portions 122 and 124 as illustrated in FIGS. 19A and 19B. While first part 1802 and second part 1804 need not be identical, such identicality allows for the parts to be nested, such as is illustrated in FIG. 10. The two pieces 1802, 1804 may be manually pressed together when in the facing orientation shown in FIG. 5.

In baffle 1800, first piece 1802 is the same as second piece 1804, except that they are coupled together in a mirror image fashion, with one of the pieces forming a top piece and the other a bottom piece, although such top and bottom orientation is arbitrary and only used here for description purposes. Each baffle part 1802, 1804 defines a domed portion 1810 at a top or bottom and a series of half domes 1130 at spaced positions around the sides of the baffle 1800 adjacent the coupling rim 151.

The half domes 1130 combine across the rims 151 of the connected halves of baffle 1800 to form generally convex domed side portions of approximately similar curvature and convexity (other than central concave areas 1134) to the convex domed portions 1810. The domed portions 1810 and half domes 1130 forming domed side portions may define six uniformly-spaced, concentric, spherical zones of similar radius, i.e., mapping onto the surface of a common sphere.

In between the domed portions 1810, 1130, the body of each baffle half 1802, 1804 is recessed relative to those domed portions 1810, 1130. There are recessed areas, portions or regions 140 between each of the neighbouring side domed portions 1130, as well as between each of those side domed portions and the top and bottom domed portions 1810. The walls of the baffle halves 1802, 1804, are formed to provide a relatively smooth transition between the domed portions 1810, 1130 and the recessed portions or regions 140 therebetween.

In contrast to the domed portions 1810, 1130, the recessed portions or regions 140 curve and transition into one another across the body of the body half 1802 or 1804. The domed portions 1810, 1130 are not continuous with each other and are generally divided from each other by the recessed portions or regions 140. Because of the curved transition of the recessed portions or regions 140 across the baffle halves 1802, 1804, saddle regions 142 may be formed in some parts of the recessed areas or regions 140.

A number of fluid passage apertures are formed in and defined by the top and bottom baffle pieces 1802, 1804. These apertures include, but are not limited to: a plurality of top apertures 1814 defined surrounding an outer apex of convex domed portion 1810; top side apertures 1812 (that are essentially the same or similar to those of fluid baffle 100 and 1100, though may be smaller and more numerous); and side apertures 1132 defined in the side domed portions 1130. Top side apertures 1812 are radially spaced from the outer apex and interrupt the transition of the domed portion 1810 toward the surrounding and adjacent recessed area 140. The above-described fluid passage apertures are all sized to be large enough to readily permit the flow of liquids therethrough without restriction, where such liquids have a viscosity approximately similar to (i.e., within about 50%) the viscosity of water, for example. Such fluid passage apertures may have regular or irregular shapes and may have dimensions ranging from 10 mm to 100 mm across, for example.

For baffle 1800, it is desirable to have a balance between the surface area defined by the wall material of the baffle and the apertures defined therebetween, so that there is enough wall material to have a flow interruption effect, but not so much wall material that the liquid in the tank cannot readily flow into and out of the interior volume of the baffle 1800 or so that the liquid does not readily drain from the interior volume. It is also desirable for the walls of the baffle 1800 to have curved continuous wall surfaces to encourage the shedding of fluid from those surfaces when fluid is drained from the tank in which the baffle is placed.

In baffle 1800, side apertures 1132 may be defined by each half domed portion 1130 such that there are two such side apertures 1132 in each half domed portion 1130. Such side apertures 1132 may be positioned to be separated by a web or strip 1131 that partially defines the domed portion 1130 and extends from an area adjacent the rim region 152 toward one of the saddle regions 142. The form of the web or strip 1131 generally follows the contour of the domed portion 1130, but because of the presence of the side apertures 1132 on each lateral side of the web or strip 1131, side edges (like those shown as 131a in FIG. 3) of the strip 1131 can play a more prominent catching or interfering role as adjacent baffles 1800 move against each other. Similarly, the side edges (like those shown as 112a in FIG. 3) defined by top side apertures 112 are configured to promote catching and interference with walls and edges of adjacent baffles 1800.

The two pieces 1802, 1804 of baffle 1800 are configured to be manually couplable together in a press fit by pushing two oppositely oriented halves together while the oppositely disposed rim 151 of each half 1802, 1804 faces the other rim 151. No rotation of the two pieces 1802, 1804 is required to effect their connection. Rather, pressing the two pieces 1802, 1804 together in a linear direction (toward each other) is required for connection.

Each baffle piece 1802, 1804 comprises male and female coupling parts 124, 122 as described above in relation to fluid baffle 100 and 1100, though comprising an alternative coupling structure as described below. The connection of the two pieces 1802, 1804 may be designed to be permanent, in the sense that the two pieces 1802, 1804 may generally not be separable without breaking some part of the baffle 1800. Alternatively, the two pieces 1802, 1804 may be designed to be separable only with the use of a special tool.

FIGS. 19A and 19B show how the alternative coupling structures of coupling portions 122, 124 couple together to form the baffle 1180. The female coupling portion 122 has deflectable barbed arms 1941 extending within a cavity defined by an outer wall 1921a. Each of the deflectable arms 1941 extends from an innermost base wall of the female coupling portion 122 toward an opening defined adjacent an edge wall 1949. The deflectable arms 1941 comprise distal end regions that define outer angled walls 1945 adjacent a rearward facing shoulder portion 1947. A space 1943 is defined between the deflectable arms 1941 and the outer wall 1921a to allow outward flexion of the arms 1941.

In some embodiments, the deflectable arms 1941 may have reinforcement ribs 1941a on exterior walls to increase the stiffness of the deflectable arms 1941. Such reinforcement ribs 1941a may act to strengthen the arms 1941 against outward deflection to thereby require greater force to assemble the two pieces 1802, 1804 and/or greater force to resist manual outward compression, for example to make manual decoupling more difficult.

Male coupling portion 124 has an inwardly tapering wall 1921b of a complementary taper to the wall 1921a of the female coupling portion 122 so that, when the male coupling portion 124 is received within the interior of the female coupling portion 122, the walls 1921b generally nest and mate inside the walls 1921a.

Male coupling portion 124 further defines two slots 1971 configured to receive the deflectable barbed arms 1941 into a space 1973 within the male coupling portion 124 defined by the wall 1921b when connected to the female coupling portion 122.

Male coupling portion 124 further comprises a deflector 1975 extending away from the internal space 1973 from between the two slots 1971 and configured to deflect the deflectable arms 1941 of the female coupling portion 122 away from each other and guide them into the slots 1971 when the coupling portions 122, 124 are brought together. In some embodiments, the deflector 1975 may comprise a pair of deflector blades configured to undergo an inward flexion towards each other when initially engaging the angled walls 1945 of the deflectable arms 1941 and provide an outward reaction force to outwardly deflect the deflectable arms 1941.

Male coupling portion 124 further comprises an anchoring member 1977 for the deflectable arms 1941 to latch onto to resist separation of the coupling portions 122, 124 once connected. The anchoring member 1977 may comprise a pair of parallel anchoring blade members extending into the internal space 1973 of the male coupling portion 124 from between the slots 171 and terminating in a flat catch surface 1979.

As the coupling portions 122, 124 are brought together, the deflectable arms 1941 are caused to outwardly deflect as the angled walls 1945 contact and slide against the deflector 1975 of the male coupling portion 124. Once the deflectable arms 1941 are received through the slots 1971 of the male coupling portion 124, the angled walls 1945 of the deflectable arms 1941 slide along the anchoring blade members 1977 until they pass the edges of the catch surfaces 1979. Then the deflectable arms 1941 resiliently deflect back towards each other so that the rearward facing shoulder portions 1947 of the deflectable arms 1941 engage the catch surfaces 1979 of the anchoring members 1977 and adopt a latched position, thereby forming a snap-fit connection. In this latched position, an upper surface 1984 of the male coupling portion 124 abuts an inner wall surface 1944 of the female coupling portion 122, adjacent the tapered walls 1921a, 1921b.

Because of the described connection configuration, the male and female coupling portions 122, 124 do not readily come apart once they have been forced into the latched position. In some embodiments, it may be possible to manually outwardly deflect the deflectable arms 1941 sufficiently to allow them to be withdrawn from the slots 1971 through which they were received. However, the hardness or stiffness of the material of the deflectable arms 1941 may be selected to minimise the practical likelihood of decoupling the male and female coupling portions 122, 124 once they are coupled together.

Alignment parts 1136, 1138 in baffle 1800 are substantially the same in form and position as those shown and described in relation to baffles 100 and 1100.

Baffle 1800 comprises at least one drainage aperture 1135 that is formed as a small slotted hole (for example, having a maximum width of about 5-10 mm). Any such drainage apertures 1135 are defined by a base section of the concave wall defining concave area 1134 where that concave wall meets a flat area contiguous with the rim 151. In some embodiments, the base section of each concave wall area 1134 may define a plurality of (radially) spaced drainage apertures 1135, such as 2, 3, 4 or 5, for example. Similarly, drainage apertures 1126 are formed as small slotted holes (for example, having a maximum width of about 5-10 mm) defined by a base section of a concave wall section 1124 adjacent the coupling portion 122 or 124 where that concave wall meets a flat area contiguous with the rim 151. In some embodiments, the base section of each concave wall area 1124 may define a plurality of (radially) spaced drainage apertures 1126, such as 2, 3, 4 or 5, for example.

As is visible in FIG. 18B, some parts of the fluid baffle 1800 comprise internal moulded reinforcement ribs. For example, the top and bottom domed portions 1810 have internal top dome reinforcement ribs 1810a extending radially from a centre of the dome portion 1810 between adjacent pairs of top apertures 1814, and between adjacent pairs of top side apertures 1812, as well as circumferentially between the plurality of top apertures 1814 and the plurality of top side apertures 1812. The top dome ribs 1810a may extend from the dome to meet concave wall ribs 1124a extending longitudinally along an internal surface of the concave portions 1124. Side dome ribs may 1130a extend circumferentially around the half domed portions 1130 and extending longitudinally along an internal surface of the strip 1131. The radially extending ribs 1810a may also be connected by a circumferential rib 140a extending around the domed portion 1810 on an internal surface of the recessed regions 140 and saddle regions 142.

Such reinforcement ribs add structural rigidity and aid in resisting deformation of the domed portions of baffle 1800 under load, while allowing a reduced wall thickness elsewhere in the baffle 1800. Such internal reinforcement ribs 140a, 1110a, 1130a can be readily moulded as part of the injection moulding process when forming the first and second parts 102, 104, 1102, 1104, 1802, 1804.

Various embodiments of the fluid baffles described herein may be formed of various sizes and with some variation as to angles or radiuses of curvature in certain areas and some variation as to exact location and size of the fluid passage apertures. However, it is generally desired that the baffles have a maximum diameter (e.g., defined by the rims 151) that is less than 380 mm. The maximum diameter may be 375 mm, 370 mm or less but may have a minimum diameter of say 100 mm, for example.

The walls of the baffle embodiments described herein may have a nominal wall thickness of around 1 mm in most areas other than where reinforcement ribs or coupling structures are present. However, some variation of this wall thickness is permissible for the embodiments disclosed herein and the wall thickness may vary to as little as 0.8 mm and as much as about 1.5 mm in different embodiments, for example. The walls of the fluid baffle halves 102, 104, 1102, 1104, 1802, 1804 described herein are generally integrally formed (in each piece) and continuous and uninterrupted, except by the fluid passage apertures and drainage apertures described herein.

Fluid baffle embodiments described herein are intended to be of reasonable structural integrity so that they do not fail their purpose when subject to forces from sloshing fluid, while also not displacing an undue amount of fluid that would otherwise be carried by the tank. In embodiments disclosed herein, the fluid baffles may displace the equivalent of about 440 ml of liquid, for example. In various other embodiments, the baffles may displace liquid of between about 420 ml and about 480 ml for a fluid baffle having a diameter of around 370 to 375 mm, for example. The weight of such fluid baffles may be approximately in the range of 400 to 500 grams, the precise weight of which may vary according to the plastic material used in their formation. In this respect, the fluid baffles may be formed of a polypropylene material, for example. An example of a suitable polypropylene material is the AP03B polypropylene impact co-polymer marketed by ExxonMobil™. For the embodiments described herein, such polypropylene materials are preferably left uncoated.

While the fluid baffles described herein are generally less than spherical, defining recesses and edges to assist in catching or interlocking of adjacent baffles, it is still desired that such fluid baffles have an outline that is not far from spherical. This is because for spherical baffles, fewer such baffles are needed in order to occupy the internal space of a liquid tank. For less optimised shapes, a greater number of baffles are required in order to fill the available volume of the tank and the larger number of baffles results in increased liquid displacement and therefore less liquid storage capacity of the tank. For baffles according to described embodiments, a slightly greater number of baffles may be required to fill a tank than would be the case for perfectly spherical baffles, but this is offset by a greater degree of interfering interaction of the fluid baffles described herein. For fluid baffles described herein, a tank filled with such baffles would have its liquid storage capacity reduced by around 1.75%, approximately.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The specification is readily understood with reference to the following Numbered Paragraphs:

Numbered Paragraph 1. A fluid baffle for use in a tank, the baffle comprising:
  a body comprising a continuous wall that defines an interior volume and defines a plurality of fluid passage apertures at spaced positions around the body to allow fluid to easily pass into and out of the interior volume;
  wherein a shape of the body is such that outermost points of the body map onto points on a notional spherical volume and wherein recessed regions of the body between the outermost points are recessed from the outermost points.

Numbered Paragraph 2. The baffle of Numbered Paragraph 1, wherein the outermost points are disposed on outermost faces, and wherein the recessed regions are recessed relative to the outermost faces.

Numbered Paragraph 3. The baffle of Numbered Paragraph 2, wherein the recessed regions define saddle regions in between the outermost faces.

Numbered Paragraph 4. The baffle of Numbered Paragraph 3, wherein at least some of the fluid passage apertures are defined in the recessed regions and/or the saddle regions.

Numbered Paragraph 5. The baffle of any one of Numbered Paragraphs 2 to 4, wherein at least some of the fluid passage apertures are defined in the outermost faces.

Numbered Paragraph 6. The baffle of any one of Numbered Paragraphs 2 to 5, wherein the outermost faces comprise convex faces.

Numbered Paragraph 7. The baffle of any one of Numbered Paragraphs 1 to 6, wherein the recessed regions comprise concave regions.

Numbered Paragraph 8. A fluid baffle for use in a tank, the baffle comprising:
a body defining an interior volume and defining a plurality of fluid passage apertures at spaced positions around the body to allow fluid to easily pass into and out of the interior volume;
wherein the body comprises a continuous wall that defines a plurality of convex regions spaced from each other around the body and defines concave regions between the convex regions.

Numbered Paragraph 9. The baffle of any one of Numbered Paragraphs 1 to 8, wherein the body is formed of a light-weight plastic material.

Numbered Paragraph 10. The baffle of any one of Numbered Paragraphs 1 to 9, wherein the body is formed of two pieces coupled together to define the interior volume.

Numbered Paragraph 11. The baffle of Numbered Paragraph 10, wherein the two pieces are identically formed.

Numbered Paragraph 12. The baffle of Numbered Paragraph 10 or Numbered Paragraph 11, wherein the two pieces are configured to nest with each other for space-efficient transport prior to assembly.

Numbered Paragraph 13. The baffle of any one of Numbered Paragraphs 10 to 12, wherein the two pieces are configured to be manually press-fitted together without rotation to form the body.

Numbered Paragraph 14. The baffle of any one of Numbered Paragraphs 10 to 13, wherein the two pieces are not readily manually separable once coupled together.

Numbered Paragraph 15. The baffle of any one of Numbered Paragraphs 10 to 14, wherein the two pieces each comprise multiple coupling portions.

Numbered Paragraph 16. The baffle of any one of Numbered Paragraphs 10 to 15, wherein each of the two pieces has at least one male coupling portion and at least one female coupling portion spaced from the at least one male coupling portion.

Numbered Paragraph 17. The baffle of Numbered Paragraph 16, wherein each of the two pieces further comprises at least one male locating portion and at least one female locating portion to mate with respective female and male locating portions when the two pieces are coupled together.

Numbered Paragraph 18. The baffle of Numbered Paragraph 17, wherein each male and female locating portion is disposed adjacent a rim of each of the two pieces and intermediate neighbouring ones of the male coupling portion and the female coupling portion.

Numbered Paragraph 19. The baffle of any one of Numbered Paragraphs 15 to 18, wherein the coupling portions are located between convex regions.

Numbered Paragraph 20. The baffle of any one of Numbered Paragraphs 10 to 19, wherein each of the two pieces comprises a flanged rim, wherein the flanged rim of each piece contacts the flanged rim of the other piece when the two pieces are coupled together.

Numbered Paragraph 21. The baffle of Numbered Paragraph 20, wherein the flanged rims together define a rim region, wherein the rim region crosses at least one convex region and at least one concave region.

Numbered Paragraph 22. The baffle of Numbered Paragraph 21, further comprising a plurality of spaced pockets adjacent the rim region and radially recessed from the rim region.

Numbered Paragraph 23. The baffle of Numbered Paragraph 22, wherein each of the pockets defines a drainage aperture that is smaller than the fluid passage apertures.

Numbered Paragraph 24. The baffle of any one of Numbered Paragraphs 1 to 23, wherein a maximum dimension across the body is between about 100 mm and about 375 mm.

Numbered Paragraph 25. The baffle of any one of Numbered Paragraphs 1 to 19, wherein the body is substantially hollow and substantially free of internal baffle structure.

Numbered Paragraph 26. The baffle of any one of Numbered Paragraphs 1 to 25, wherein the body defines a shell structure.

Numbered Paragraph 27. The baffle of any one of Numbered Paragraphs 1 to 26, wherein the shape of the body is configured to promote interference with adjacent ones of the baffles within the tank to reduce relative movement between adjacent baffles when compared to spherical baffles.

Numbered Paragraph 28. The baffle of any one of Numbered Paragraphs 1 to 27, wherein a mass of the baffle is between about 100 grams and about 700 grams.

Numbered Paragraph 29. The baffle of any one of Numbered Paragraphs 1 to 28, wherein the baffle is formed by injection moulding using a polypropylene impact copolymer material.

Numbered Paragraph 30. A fluid baffle comprising a body defining a hollow interior volume and having multiple fluid passage apertures spaced around the body to allow fluid to freely pass into or out of the interior volume, wherein the body has multiple rounded exterior faces without the body having a spherical shape.

Numbered Paragraph 31. A liquid tank comprising multiple ones of the fluid baffle of any one of Numbered Paragraphs 1 to 30 disposed inside the tank.

Numbered Paragraph 32. A method of making a fluid baffle kit, comprising: forming first and second baffle pieces that are connectable to each other, the first and second baffle pieces defining fluid passage apertures and each defining a non-hemispherical concave interior banded by an outer rim, wherein when the first and second baffle pieces are connected to each other along their outer rims, the first and second baffle pieces define a baffle body having a hollow non-spherical interior volume.

Numbered Paragraph 33. The method of Numbered Paragraph 32, wherein the outer rim of each of the first and second baffle pieces is formed to be approximately circular.

Numbered Paragraph 34. The method of Numbered Paragraph 33, wherein each of the first and second baffle pieces is formed to have convex exterior surfaces separated by recessed exterior surfaces.

Numbered Paragraph 35. The method of Numbered Paragraph 34, wherein at least one of the convex exterior surfaces is formed to at least partially define one or more of the fluid passage apertures.

Numbered Paragraph 36. The method of Numbered Paragraph 34 or Numbered Paragraph 35, wherein the first and second baffle pieces are formed to define fluid passage apertures in the recessed exterior surfaces.

Numbered Paragraph 37. The method of any one of Numbered Paragraphs 32 to 36, wherein the first and second baffle pieces are formed to have mating connection portions, which when mated together, retain the first and second baffle pieces in a connected state.

Numbered Paragraph 38. A method of assembly of a fluid baffle, comprising receiving the fluid baffle kit formed by the method of any one of Numbered
Paragraphs 32 to 37; and connecting together the first and second baffle pieces so that the first and second baffle pieces are in a connected state.

Numbered Paragraph 39. A fluid baffle kit, comprising:

first and second baffle pieces that are connectable to each other, the first and second baffle pieces defining fluid passage apertures and each defining a non-hemispherical concave interior banded by an outer rim, wherein when the first and second baffle pieces are connected to each other along their outer rims, the first and second baffle pieces define a baffle body having a hollow non-spherical interior volume.

The invention claimed is:

1. A fluid baffle for use in a tank, the baffle comprising:
a body at least partially formed by a first baffle piece comprising a first continuous wall coupled to a second baffle piece comprising a second continuous wall to define an interior volume and a plurality of fluid passage apertures at spaced positions around the body to allow fluid to easily pass into and out of the interior volume,
wherein the first continuous wall defines a first flanged rim, the second continuous wall defines a second flanged rim, and the first flanged rim of the first baffle piece contacts the second flanged rim of the second baffle piece to define a rim region when the first and second baffle pieces are coupled together,
wherein the first and second baffle pieces each comprise multiple coupling portions in the rim region configured to be manually press-fitted together without rotation to form the body,
wherein the first and second baffle pieces each comprise multiple alignment parts in the rim region, with the first flanged rim defining at least one alignment part formed as a projecting part, and the second flanged rim defining at least one alignment part formed as a recessed part configured to receive the projecting alignment part of the first flanged rim,
wherein the multiple coupling portions comprise male coupling portions and female coupling portions,
wherein each female coupling portion has deflectable arms extending within a cavity defined by an outer wall, and
wherein each male coupling portion has an inwardly tapering wall of a complementary taper to the wall of the female coupling portion so that, when the male coupling portion is received within the interior of the female coupling portion, the walls of the male coupling portion generally nest and mate inside the walls of the female coupling portion.

2. The baffle of claim 1, wherein the projecting part has inwardly tapering walls as it extends away from a generally flat area of the first flanged rim and the recessed part has similarly tapered and complementary walls to receive and accommodate the tapered walls of the projecting part.

3. The baffle of claim 1, wherein the projecting part defines an end aperture and the recessed part defines an end aperture, such that, when the projecting part is received in the recessed part, the end apertures are generally aligned in order to allow fluid passage therethrough to avoid retaining liquid in or around the alignment parts.

4. The baffle of claim 1, wherein each of the first and second baffle pieces includes projecting alignment parts and recessed alignment parts provided in pairs of opposite projection orientations in close proximity to each other.

5. The baffle of claim 1, wherein the multiple coupling portions comprise at least one deflectable barbed arm on at least one of the first and second flanged rims, and at least one anchoring member on the other one of the first and second flanged rims, and wherein the deflectable arm includes a distal end region defining an outer angled wall adjacent a rearward facing shoulder portion configured to engage a catch surface of the anchoring member to form a snap-fit connection.

6. The baffle of claim 1, wherein the deflectable arms comprise distal end regions that define outer angled walls adjacent a rearward facing shoulder portion.

7. The baffle of claim 1, wherein a space is defined between the deflectable arms to allow inward flexion of the arms.

8. The baffle of claim 7, wherein the space is configured to allow receipt of a central portion of the male coupling portion when the two parts are connected.

9. The baffle of claim 1, wherein each of the deflectable arms extends from an innermost base wall of the female coupling portion toward an opening defined adjacent an edge wall.

10. The baffle of claim 1, wherein the male coupling portion defines angled walls adjacent receiving apertures and catch surfaces in an inner end section of the male coupling portion configured such that, as the coupling portions are brought together, the deflectable arms are caused to inwardly deflect as the angled walls of the arms contact and slide against the angled walls of the male coupling portion, pass through the receiving apertures, and resiliently deflect back outwardly so that the arms adopt a latched position with the shoulders of the arms abutting the catch surfaces of the male coupling portion.

11. The baffle of claim 1, wherein the male coupling portion defines angled walls adjacent receiving apertures and catch surfaces in an inner end section of the male coupling portion configured such that, as the coupling portions are brought together, the deflectable arms are caused to outwardly deflect as the angled walls of the arms contact and slide against the angled walls of the male coupling portion, pass through the receiving apertures, and resiliently deflect back outwardly so that the arms adopt a latched position with the shoulders of the arms abutting the catch surfaces of the male coupling portion.

12. The baffle of claim 11, wherein the male coupling portion further comprises a deflector extending away from the inner end section and configured to deflect the deflectable arms of the female coupling portion away from each other and guide them into the receiving apertures when the male and female coupling portions are brought together.

13. The baffle of claim 1, wherein the deflectable arms comprise reinforcement ribs on exterior walls to increase the stiffness of the deflectable arms.

14. The baffle of claim 1, wherein each of the first and second baffle pieces has at least one male coupling portion and at least one female coupling portion spaced from the at least one male coupling portion.

15. The baffle of claim 1, wherein the first and second baffle pieces are identically formed, or
wherein the first and second baffle pieces are configured to nest with each other for space-efficient transport prior to assembly.

16. The baffle of claim 1, wherein the first and second continuous walls each define between 60% to 90% of the surface area of the respective baffle piece, and the plurality of fluid passage apertures collectively establish all or almost all of the rest of the surface area.

17. The baffle of claim 1, wherein the first and second continuous walls define multiple rounded exterior faces without the body having a spherical shape.

18. The baffle of claim 1, wherein the baffle further comprises a plurality of spaced pockets adjacent the rim region and radially recessed from the rim region, and
    wherein each of the pockets defines a drainage aperture that is smaller than the fluid passage apertures.

19. The baffle of claim 1,
    wherein the body defines a shell structure, or
    wherein the shape of the body is configured to promote interference with adjacent ones of the baffles within the tank to reduce relative movement between adjacent baffles when compared to spherical baffles, or
    wherein a mass of the baffle is between about 100 grams and about 700 grams, or
    wherein the baffle is formed by injection moulding using a polypropylene impact copolymer material, or
    wherein a maximum dimension across the body is between about 100 mm and about 375 mm.

\* \* \* \* \*